United States Patent Office 3,234,095
Patented Feb. 8, 1966

3,234,095
21-METHYL AND 21-HYDROXYMETHYL STEROID COMPOUNDS
Eugene J. Agnello and Gerald D. Laubach, Lyme, Conn., assignors to Chas. Pfizer & Co., Inc., New York, N.Y., a corporation of Delaware
No Drawing. Filed June 19, 1963, Ser. No. 288,880
7 Claims. (Cl. 167—77)

This application is concerned with new and useful steroid compounds. More particularly, it is concerned with certain steroids having adrenocortical activity characterized by having unique chemical features in the carbon atoms side chain at the 17β-position. It is concerned also with a method of making these valuable compounds and with pharmaceutical compositions containing them together with pharmaceutically-acceptable excipients.

This application is a continuation-in-part of previously filed patent applications Serial Nos. 740,600, 764,272, 764,273, 800,992 and 3,996, filed June 9, 1958, September 30, 1958, September 30, 1958, March 23, 1959, and January 22, 1960, respectively, all now abandoned. It should be noted that the system of nomenclature used herein is different from that employed in the previous abandoned applications. It is felt that the present system is in more strict conformance with preferred practice.

Compounds within the purview of this invention include those having the formula:

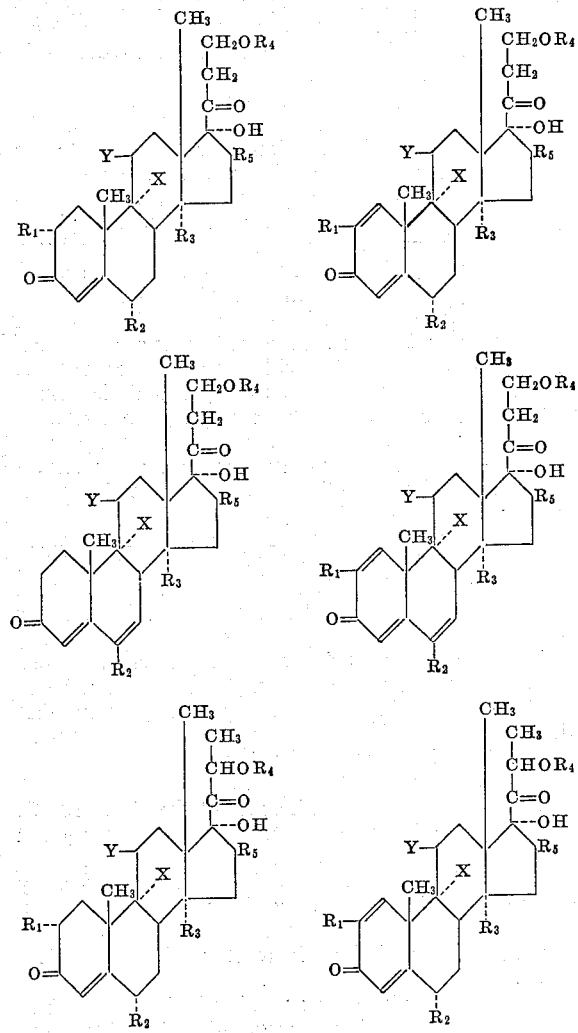

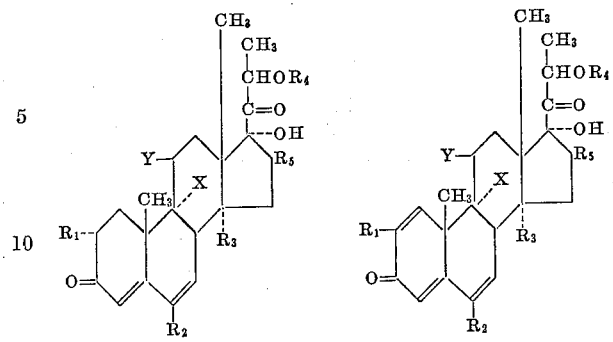

In the above structures, $R_1$ is hydrogen or methyl; $R_2$ is hydrogen, fluorine, chlorine or methyl; $R_3$ is hydrogen or hydroxyl; $R_4$ is hydrogen or acyl, said acyl group being derived from mono- and dicarboxylic acids containing up to ten carbon atoms; and $R_5$ is

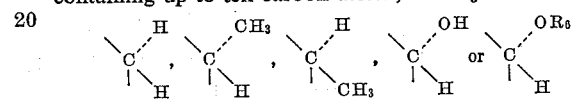

wherein $R_6$ is an acyl group derived from mono- or dicarboxylic acids containing up to ten carbon atoms and containing only carbon, hydrogen and oxygen. The water solubility of the compounds derived from dicarboxylic acids is enhanced by conversion to alkali metal or alkaline earth metal salts by reaction with a suitable base such as sodium carbonate or calcium hydroxide. The water solubility of compounds derived from amino carboxylic acids is enhanced by conversion to acid addition salts by reaction with a suitable acid such as hydrochloric acid or sulfuric acid. These salts are included within the purview of this invention. In the above structures, X is hydrogen, α-halogen, α-methoxy or α-ethoxy, Y is keto or β-hydroxyl. In the above structures, at least three of $R_1$, $R_2$, $R_3$ and the additional substituent on a hydrogen substituted number sixteen carbon atom is always hydrogen.

Also included within the preferred compounds of this invention are further compounds in which hydroxyl groups at the 16- and 17-positions are derivatized with aldehydes or ketals known generically as acetonides, in this case 16α,17α-acetonides. The acetonide moiety of preferred compounds of this invention contain from two to nine carbon atoms.

The acetonides within the purview of this invention are prepared by procedures well known to those skilled in the art. They may be prepared, for example, by the procedure described by Woodward et al. in the Journal of the American Chemical Society, 74, p. 4241 (1952). In this procedure, the steroid compound is taken up in the carbonyl compound, for example, acetone, methyl ethyl ketone or di-n-butyl ketone which has been dried over a suitable drying agent such as anhydrous potassium carbonate. Anhydrous copper sulfate is added and the mixture agitated for from about 24 to about 48 hours. The mixture is then filtered and the desired product recovered, for example, by removal of the solvent in vacuo. Other methods of forming acetals and ketals are also applicable. For example, the steroid may be taken up in the liquid aldehyde or ketone and refluxed in the presence of a catalytic amount of a mineral acid such as concentrated hydrochloric acid, for from about 1 to about 10 minutes. The desired product is precipitated by the addition of water.

Starting compounds used in the preparation or the valuable compounds of this invention include steriod compounds substituted at the 17β-position with a halo-substituted hydroxylated propanoyl group such as α- hydroxy-β-halo-propanoyl and α-halo-β-hydroxy propanoyl wherein the halo group is bromine or iodine. These compounds are prepared in accordance with the procedure fully described and illustrated in co-pending and concurrently filed patent application, Serial No. 3,998, now Patent No. 3,031,375.

The following sequence shows the preparation of Δ⁴-pragene-11β,17α,21-triol-3,20-dione one of the compounds of this invention. It is equally applicatble to the preparation of other compounds within the scope of the invention.

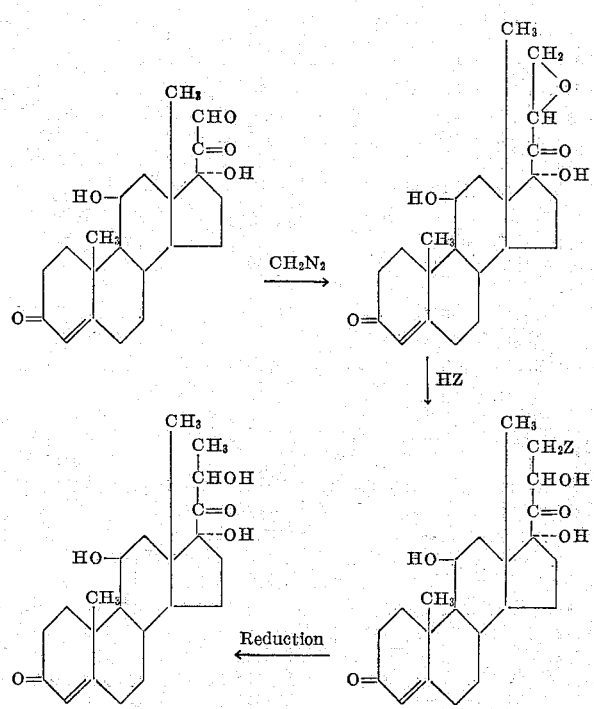

In the above compounds, Z is a bromine or iodine.

It will be noted from the above structures that the presence of a new asymmetric center at C–21 gives rise to the possibility of two epimers.

This sequence of reactions and the intermediate products are described and claimed in copending and concurrently filed patent applications Serial Nos. 3,998, now Patent No. 3,031,375, and 3,999, now Patent No. 3,031,-444. The requisite aldehydes are prepared from the corresponding 21 - hydroxylated compounds by reaction with cupric acetate as described in U.S. Patent 2,773,078 issued December 4, 1956.

The epoxide is prepared by reaction of the aldehyde with diazomethane in a reaction inert solvent at a temperature of from about 0° C. to about 25° C. for a period of from about 1 to about 24 hours.

The desired bromo or iodohydrin is prepared by reaction of the epoxide with hydrogen bromide or iodide, preferably in equimolar quantities, in a reaction inert organic solvent at a temperature of from about −15° C. to about 30° C. for a period of from about 15 minutes to about 4 hours.

As previously stated, the products of this invention having the asymmetric center at C–21 exist in epimeric forms. In accordance with the method of synthesis described herein, both epimers are obtained. Both epimers are active, and of course the mixture is active, so that for most therapeutic purposes it is immaterial whether a mixture or a particular epimer is employed. It is rarely necessary to separate the isomers, but this can be accomplished, if desired, using standard well-known methods. For example, the 21-alcohols can be separated by paper chromatography using chloroform as the mobile phase and formamide as the stationary phase. Each product may be isolated by dissolving it from the paper using a suitable solvent such as ethyl acetate or chloroform.

The specific epimers may also be prepared and isolated. The B-isomer is prepared by reduction of the 17β-pyruvoyl compounds described and claimed in copending and concurrently filed patent application, Serial No. 4,000, now U.S. Patent No. 3,093,665, with yeast or with alkali metal hydrides as illustrated below. The A- and B-isomer may be separately prepared and isolated by the method described and claimed in copending and concurrently filed patent application Serial No. 3,995, now U.S. Patent No. 3,045,010. This procedure is also illustrated in the examples.

For the preparation of the valuable compounds of this invention, the steroid compound with the side chain bromohydrin or iodohydrin function is treated with a debrominating or deiodinating agent such as zinc and acetic acid, or zinc and ethanol or other lower alkanol. Reductive dehalogenation with Raney nickel is also applicable. Both procedures are illustrated below.

Suitable solvents for carrying out the reaction with Raney nickel include reaction inert organic solvents such as lower aliphatic oxygenated solvents including ethers, alcohols, acids and ketones containing up to five carbon atoms. Methanol, ethanol, propanol, isopropanol, pentanol, acetone, methyl isopropyl ketone, dioxane, acetic acid and propionic acid are examples of suitable solvents. The use of a mixed solvent such as methanol-acetic acid is sometimes advantageous.

The amount of Raney nickel used is not critical although to insure the most economical utilization of the steriod starting material, it is generally preferred to use an excess of this dehalogenating agent. From four to twenty grams of Raney nickel per gram of steroid starting material has been found to provide suitable yields. The preferred excess, as will be recognized by those skilled in the art, will depend upon the degree of activity of the Raney nickel. This in turn will depend upon its previous treatment. With Raney nickel which has been washed first with water, then with acetic acid, then with methanol and finally with acetone in accordance with known procedures, it is usually found that from ten to fifteen grams of Raney nickel per gram of steriod give suitable results. However, the Raney nickel can be used without previous treatment or with other known treatments and still function as a dehalogenating agent for the bromohydrin or iodohydrin.

The duration of the reaction is not critical depending only upon the degree of activity of the Raney nickel. This degree of activity is readily determined by tests well known to those skilled in the art, and include, for example, the reduction of known compounds requiring varying degrees of reducing activity. Reaction periods as short as five minutes and as long as twenty-four hours have been used. It is, however, generally found that suitable yields can be obtained using a reaction period of from five minutes to two hours.

For optimum yields the temperature of the reaction should be controlled so that it does not rise above 30° C. during the reaction period and it is best to carry out the reaction between 0° C. and 15° C.

Although it is not essential, it is preferred to carry out the reaction in an inert atmosphere such as a nitrogen atmosphere. This assures the most efficient use of the Raney nickel by minimizing its reaction with atmospheric oxygen.

The desired product can be isolated after removal of the Raney nickel by simply evaporating the solvent and purified by recrystallization from a suitable solvent such as ethyl acetate. It can also be purified by trituration with a suitable wash liquid such as ethyl acetate or ether-ethyl acetate.

If the solvent used is a lower aliphatic acid or a mixture containing such an acid it may be desirable to neutralize the acid with an alkaline reagent such as ammonium or sodium hydroxide and to isolate the active compound by extraction from the neutralized aqueous mixture with an organic solvent. Suitable extraction solvents include water immiscible lower halogenated alkanes such as ethylene chloride, chloroform and carbon tetrachloride, or ketones such as methyl isobutyl ketones. The product is isolated from the extraction solvent and purified as described above.

The biologically active compounds of this invention may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intra-articular injection aqueous suspensions may be employed. In this case various suspending and wetting agents may be added to the compositions to obtain a suspension not tending to settle out easily or to pack down in the bottle in which it is stored. Intra-muscular and subcutaneous dosage forms may also be prepared by standard pharmaceutical practice.

Among the compounds contemplated by the instant invention are those which bear an acyl group at the 21-position, said acyl group being derived from amino carboxylic acids containing up to ten carbon atoms. Special mention is made of the 21-diethyl aminoacetate esters of steroids bearing a methyl group on the 21-position. Particularly noteworthy are the 21-diethylaminoacetate esters of $6\alpha$-fluoro-21-methyl-$\Delta^{1,4}$-pregnadiene-$11\beta,17\alpha,21$-triol - 3,20 - dione and $6\alpha,9\alpha$-difluoro-21-methyl-$\Delta^{1,4}$-pregnadiene-$11\beta,17\alpha,21$-triol-3,20-dione and the acid addition salts thereof, such as the hydrochlorides.

These may readily be prepared from the 21-hyroxyl compounds of the instant invention by procedures to be exemplified in detail hereinafter. An especially convenient sequence involves conversion of the 21-hydroxyl group to an amine-reactive acyl group, among which may be mentioned the 21-chloroacetate, and then treatment of the amine-reactive acyl group with an appropriate amine. The 21-acyl derivative of the amino carboxylic acid thus obtained can be converted to its acid addition salts by treatment with the desired acid according to procedures to be exemplified hereinafter.

The following examples are given solely for the purpose of illustration and are not to be construed as limitations of this invention, many apparent variations of which are possible without departing from the spirit or scope thereof.

*Example I.—21-methyl-$\Delta^{1,4}$-pregnadiene-$11\beta,17\alpha,21$-triol-3,20-dione*

A solution containing 500 mg. of 21-bromomethyl-$\Delta^{1,4}$-pregnadiene-$11\beta,17\alpha,21$-triol-3,20-dione in 200 ml. of absolute methanol was cooled to 0° C. and 5 g. of Raney nickel in 50 ml. of methanol was added. The mixture was stirred for two hours, filtered and the methanol removed by evaporation. The residue was triturated with a 1:1 mixture of ethyl acetate and ether. The product was recovered by filtration.

*Example II.—21 - hydroxymethyl - $\Delta^{1,4}$-pregnadiene-$11\beta$, $17\alpha$-diol-3,20-dione*

A solution containing 500 mg. of 21-iodo-21-hydroxymethyl - $\Delta^{1,4}$-pregnadiene-$11\beta,17\alpha$-diol-3,20-dione in 200 ml. of dioxane was cooled to 30° C. and a mixture containing 20 g. of Raney nickel in 100 ml. of dioxane was added. The reaction vessel was flushed with nitrogen and the mixture stirred for five minutes. The mixture was filtered, the solvent removed in vacuo and the residue triturated with 1:1 ethyl acetate in ether. The desired product was recovered by filtration.

*Example III.—21 - methyl - $\Delta^4$-pregnene-$11\beta,17\alpha,21$-triol-3,20-dione*

A solution containing 500 mg. of 21-iodomethyl-$\Delta^4$-pregnene-$11\beta,17\alpha,21$-triol-3,20-dione in 100 ml. of isopropanol was cooled to 10° C. and a mixture containing 4 g. of Raney nickel in 50 ml. of isopropanol was added. (The Raney nickel had been previously washed with water and then with diluted acetic acid to a pH of 7. It was then washed with methanol, the methanol removed and the Raney nickel refluxed for 30 minutes in acetone.) The reaction mixture was stirred for 15 minutes, filtered and the solvent removed in vacuo. The desired product was triturated with 1:1 ethyl acetate and ether and recovered by filtration.

The corresponding 21-hydroxymethyl compound was similarly prepared from 21-bromo-21-hydroxymethyl-$\Delta^4$-pregnene-$11\beta,17\alpha$-diol-3,20-dione.

*Example IV.—21 - methyl-$\Delta^{1,4,6}$-pregnatriene-$11\beta,17\alpha,21$-triol-3,20-dione*

A solution containing 500 mg. of 21-iodomethyl-$\Delta^{1,4,6}$-pregnatriene-$11\beta,17\alpha,21$-triol-3,20-dione in a solvent mixture containing 50 ml. of glacial acetic acid and 150 ml. of methanol was prepared. It was cooled to 10° C. and a mixture containing 5 g. of Raney nickel in 50 ml. of methanol was added. The reaction vessel was flushed with nitrogen and the mixture stirred for one hour. The reaction mixture was filtered and the methanol removed by evaporation in vacuo. The remaining acetic acid solution was diluted with one-half its volume of water and then adjusted to pH 10 with 10% ammonium hydroxide solution. The resulting mixture was extracted with chloroform and the organic layer separated and washed with water. It was dried over anhydrous sodium sulfate, filtered and the solvent removed in vacuo. The residue was triturated with 1:1 ethyl acetate and ether and the desired pure product recovered by filtration.

The corresponding 21-hydroxymethyl compound was similarly prepared from 21-iodo-21-hydroxymethyl-$\Delta^{1,4,6}$-pregnatriene-$11\beta,17\alpha$-diol-3,20-dione.

*Example V.—$9\alpha$ - fluoro-21-methyl-$\Delta^4$-pregnene-$11\beta,17\alpha$, 21-triol-3,20-dione*

A solution containing 500 mg. of $9\alpha$-fluoro-21-bromomethyl-$\Delta^4$-pregnene-$11\beta,17\alpha,21$-triol-3,20-dione in 200 ml. of acetone was cooled to 15° C. and a mixture containing 4 g. of Raney nickel in 50 ml. of acetone was added. The mixture was stirred for 15 minutes and filtered. The solvent was removed in vacuo and the residue triturated with 1:1 ethyl acetate and ether. The pure product was recovered by filtration.

The corresponding 21-hydroxymethyl compound was similarly prepared from $9\alpha$-fluoro-21-iodo-21-hydroxymethyl-$\Delta^4$-pregnene-$11\beta,17\alpha$-diol-3,20-dione.

*Example VI.—$9\alpha$ - fluoro-21-methyl-$\Delta^{1,4}$-pregnadien-$11\beta$, $17\alpha,21$-triol-3,20-dione*

A solution containing 500 mg. of $9\alpha$-fluoro-21-bromomethyl - $\Delta^{1,4}$ - pregnadiene-11$\beta$,17$\alpha$,21-triol-3,20-dione in 200 ml. of acetone was cooled to 15° C. and a mixture containing 20 g. of Raney nickel in 50 ml. of acetone was added. The mixture was stirred for 15 minutes and filtered. The solvent was removed in vacuo and the residue triturated with 1:1 ethyl acetate and ether. The pure product was recovered by filtration.

The corresponding 21-hydroxymethyl compound was identically prepared from 9$\alpha$-fluoro-21-iodo-21-hydroxymethyl-$\Delta^{1,4}$-pregnadiene-11$\beta$,17$\alpha$-diol-3,20-dione.

*Example VII.—9$\alpha$-fluoro-21-methyl-$\Delta^{1,4,6}$-pregnatriene-11$\beta$,17$\alpha$,21-triol-3,20-dione*

A solution containing 500 mg. of 9$\alpha$-fluoro-21-iodomethyl - $\Delta^{1,4,6}$-pregnatriene-11$\beta$,17$\alpha$,21triol-3,20-dione in 200 ml. of ethanol was cooled to 10° C. and a mixture containing 15 g. of Raney nickel in 50 ml. of ethanol was added. The mixture was stirred for 24 hours and filtered. The solvent was removed in vacuo and the residue triturated with 1:1 ethyl acetate and ether. The pure product was recovered by filtration.

The corresponding 21-hydroxymethyl carbon was similarly prepared from 9$\alpha$-fluoro-21-bromo-21-hydroxymethyl-$\Delta^{1,4,6}$-pregnatriene-11$\beta$,17$\alpha$-diol-3,20-dione.

*Example VIII.—9$\alpha$-bromo-21-methyl-$\Delta^4$-pregnene-11$\beta$,17$\alpha$,21-triol-3,20-dione*

A solution containing 500 mg. of 9$\alpha$-bromo-21-iodomethyl-$\Delta^4$-pregene-11$\beta$,17$\alpha$,21-triol-3,20-dione in 200 ml. of methanol was cooled to 15° C. and a mixture containing 15 g. of Raney nickel in 50 ml. of methanol was added. The mixture was stirred for 1 hour and filtered. The solvent was removed in vacuo and the residue triturated with 1:1 ethyl acetate and ether. The pure product was recovered by filtration.

The corresponding 21-hydroxymethyl compound was similarly prepared from 9$\alpha$-bromo-21-iodo-21-hydroxymethyl-$\Delta^4$-pregnene-11$\beta$,17$\alpha$-diol-3,20-dione.

*Example IX.—6$\alpha$-fluoro-21-methyl-$\Delta^4$-pregnene-11$\beta$,17$\alpha$,21-triol-3,20-dione*

A solution containing 500 mg. of 6-fluoro-21-bromomethyl-$\Delta^4$-pregnene-11$\beta$,17$\alpha$,21-triol-3,20-dione in 200 ml. of absolute methanol was cooled to 0° C. and 5 g. of Raney nickel in 50 ml. of methanol was added. The mixture was stirred for two hours, filtered and the methanol removed by evaporation. The residue was triturated with 1:1 mixture of ethyl acetate and ether. The product was removed by filtration.

*Example X.—6$\alpha$-fluoro-21-hydroxymethyl-$\Delta^4$-pregnene-11$\beta$,17$\alpha$-diol-3,20-dione*

A solution containing 500 mg. of 6$\alpha$-fluoro-21-iodo-21-hydroxymethyl - $\Delta^4$ - pregnene-11$b$,17$\alpha$-diol-3,20-dione in 100 ml. of isopropanol was cooled to 10° C. and a mixture containing 4 g. of Raney nickel in 50 ml. of isopropanol was added. (The Raney nickel has been previously washed with water and then with diluted acetic acid to a pH of 7. It was then washed with methanol, the methanol removed and the Raney nickel refluxed for 30 minutes in acetone.) The reaction mixture was stirred for 15 minutes, filtered and the solvent removed in vacuo. The desired product was triturated with 1:1 ethyl acetate and ether and recovered by filtration.

*Example XI.—16$\alpha$,12-dimethyl-$\Delta^4$-pregnene-11$\beta$,17$\alpha$,21-triol-3,20-dione*

A solution containing 500 mg. of 16$\alpha$-methyl-21-bromo-$\Delta^4$-pregnene-11$\beta$-17$\alpha$,21-triol-3,20-dione in 200 ml. of absolute methanol was cooled to 0° C. and 5 g. of Raney nickel in 50 ml. of methanol was added. The mixture was stirred for two hours, filtered and the methanol removed by evaporation. The residue was triturated with a 1:1 mixture of ethyl acetate and ether. The product was recovered by filtration.

The corresponding 21-hydroxymethyl patent was similarly prepared from 21-iodo-16$\alpha$-methyl-21-hydroxymethyl-$\Delta^4$-pregnene-11$\beta$,17$\alpha$-diol-3,20-dione.

*Example XII.—16$\beta$,21-dimethyl-$\Delta^4$pregnene-11$\beta$,17$\alpha$,21-triol-3,20-dione*

A solution containing 500 mg. of 16$\beta$-methyl-21-bromo-$\Delta^4$-pregnene-11$\beta$,17$\alpha$,21-triol-3,20-dione in 200 ml. of absolute methanol was cooled to 0° C. and 5 g. of Raney nickel in 50 ml. of methanol was added. The mixture was stirred for two hours, filtered and the methanol removed by evaporation. The residue was triturated with a 1:1 mixture of ethyl acetate and ether. The product was recovered by filtration.

The corresponding 21-hydroxymethyl patent was similarly prepared from 21-iodo-16$\beta$-methyl-21-hydroxymethyl-$\Delta^4$-pregnene-11$\beta$,17$\alpha$-diol,3,20-dione.

*Example XIII.—6$\alpha$-chloro-21-methyl-$\Delta^4$-pregnene-11$\beta$,17$\alpha$,21-triol-3,20-dione*

A solution containing 500 mg. of 6$\alpha$-chloro-21-bromomethyl-$\Delta$-pregnene-11$\beta$,17$\alpha$,21-triol-3,20-dione in 200 ml. of absolute methanol was cooled to 0° C. and 5 g. of Raney nicekl in 50 ml. of methanol was added. The mixture was stirred fortwo hours, filtered and the methanol removed by evaporation. The residue was triturated with 1:1 mixture of ethyl acetate and ether. The product was recovered by filtration.

The corresponding 21-hydroxymethyl compound was similarly prepared from 6$\alpha$-chloro-21-bromo-21-hydroxymethyl-$\Delta^4$-pregnene-11$\beta$,17$\alpha$-diol-3,20-dione.

*Example XIV.—21-methyl-$\Delta^{1,4}$-pregnadiene-11$\beta$,17$\alpha$,21-triol-3,20-dione*

A solution containing 100 mg. of 21-iodomethyl-$\Delta^{1,4}$-pregnadiene-11$\beta$,17$\alpha$,21-triol-3,20-dione and 150 mg. of zinc dust was stirred for 5 hours at room temperature. An additional 100 mg. of zinc dust was added and the stirring was continued for another 11 hours. The mixture was filtered and the solvent evaporated in vacuo. The residue was taken up in 5 ml. of chloroform and the solution washed with 2 ml. of water. The organic layer was separated, dried over anhydrous sodium sulfate, filtered and the filtrate evaporated to dryness to leave the desired product as a residue. It was purified by trituration with ether.

The following list exemplifies certain of the compounds within the purview of this invention all prepared using the foregoing procedures. It is given to avoid unnecessary repetition of experimental details. It should be noted that the compounds listed are all 21-hydroxy compounds. Similar 21-hydroxymethyl compounds are prepared from the appropriate starting materials in accordance with the foregoing examples.

It should be noted that in the foregoing examples and in the following list no references are made to the two epimers of each compound which exist. The name of each compound, in accordance with the usual practice of the art, is intended to encompass both the A- and the B-isomer. As stated above, these epimers are readily separated, for example, by paper cromatography. The 21-esters are separated using a 1:3 mixture of chloroform and benzene as the mobile phase and formamide as the stationary phase. The 21-hydroxy compounds are separated using chloroform as the mobile phase and formamide as the stationary phase.

9$\alpha$-chloro-21-methyl-$\Delta^4$-pregnene-11$\beta$,17$\alpha$,21-triol-3,20-dione 9$\alpha$-iodo-21-methyl-$\Delta^4$-pregnene-11$\beta$,17$\alpha$,21-triol-3,20-dione 9$\alpha$-bromo-21-methyl-$\Delta^4$-pregnene-11$\beta$,17$\alpha$,21-triol-3,20-dione 9$\alpha$-ethoxy-21-methyl-$\Delta^4$-pregnene-11$\beta$,17$\alpha$,21-triol-3,20-dione 21-methyl-$\Delta^4$-pregnene-17$\alpha$,21-diol-3,11,20-trione.

9α-fluoro-21-methyl-Δ⁴-pregnene-17α,21-diol-3,11,20-trione
9α-chloro-21-methyl-Δ⁴-pregnene-17α,21-diol-3,11,20-trione
9α-bromo-21-methyl-Δ⁴-pregnene-17α,21-diol-3,11,20-trione
9α-iodo-21-methyl-Δ⁴-pregnene-17α,21-diol-3,11,20-trione
9α-methoxy-21-methyl-Δ⁴-pregnene-17α,21-diol-3,11,20-trione
9α-ethoxy-21-methyl-Δ⁴-pregnene-17α,21-diol-3,11,20-trione 2α,21-dimethyl-Δ⁴-pregnene-11β,17α,21-triol-3-,20-dione
2α,21-dimethyl-9α-fluoro-Δ⁴-pregnene-11β,17α,21-triol-3,20-dione
2α,21-dimethyl-9α-chloro-Δ⁴-pregnene-11β,17α,21-triol-3,20-dione
2α,21-dimethyl-9α-bromo-Δ⁴-pregnene-11β,17α,21-triol-3,20-dione
2α,21-dimethyl-9α-iodo-Δ⁴-pregnene-11β,17α,21-triol-3,20-dione
2α,21-dimethyl-9α-methoxy-Δ⁴-pregnene-11β,17α,21-triol-3,20-dione
2α,21-dimethyl-9α-ethoxy-Δ⁴-pregnene-11β,17α,21-triol-3,20-dione 2α,21-dimethyl-Δ⁴-pregnene-17α,21-diol-3,11,20-trione
2α,21-dimethyl-9α-fluoro-Δ⁴-pregnene-17α,21-diol-3,11,20-trione
2α,21-dimethyl-9α-chloro-Δ⁴-pregnene-17α,21-diol-3,11,20-trione
2α,21-dimethyl-9α-bromo-Δ⁴-pregnene-17α,21-diol-3,11,20-trione
2α,21-dimethyl-9α-iodo-Δ⁴-pregnene-17α,21-diol-3,11,20-trione
2α,21-dimethyl-9α-methoxy-Δ⁴-pregnene-17α,21-diol-3,11,20-trione
2α,21-dimethyl-9α-ethoxy-Δ⁴-pregnene-17α,21-diol-3,11,20-trione 6α,21-dimethyl-Δ⁴-pregnene-11β,17α,21-triol-3,20-dione
6α,21-dimethyl-9α-fluoro-Δ⁴-pregnene-11β,17α,21-triol-3,20-dione
6α,21-dimethyl-9α-chloro-Δ⁴-pregnene-11β,17α,21-triol-3,20-dione
6α,21-dimethyl-9α-iodo-Δ⁴-pregnene-11β,17α,21-triol-3,20-dione
6α,21-dimethyl-9α-bromo-Δ⁴-pregnene-11β,17α,21-triol-3,20-dione
6α,21-dimethyl-9α-methoxy-Δ⁴-pregnene-11β,17α,21-triol-3,20-dione
6α,21-dimethyl-9α-ethoxy-Δ⁴-pregnene-11β,17α,21-triol-3,20-dione 6α,21-dimethyl-Δ⁴-pregnene-17α,21-diol-3,11,20-trione
6α,21-dimethyl-9α-fluoro-Δ⁴-pregnene-17α,21-diol-3,11,20-trione
6α,21-dimethyl-9α-chloro-Δ⁴-pregnene-17α,21-diol-3,11,20-trione
6α,21-dimethyl-9α-bromo-Δ⁴-pregnene-17α,21-diol-3,11,20-trione
6α,21-dimethyl-9α-iodo-Δ⁴-pregnene-17α,21-diol-3,11,20-trione
6α,21-dimethyl-9α-methoxy-Δ⁴-pregnene-17α,21-diol-3,11,20-trione
6α,21-dimethyl-9α-ethoxy-Δ⁴-pregnene-17α,21-diol-3,11,20-trione 9α-chloro-21-methyl-Δ⁴-pregnene-11β,14α,17α,21-tetrol-3,20-dione
9α-bromo-21-methyl-Δ⁴-pregnene-11β,14α,17α,21-tetrol-3,20-dione
9α-iodo-21-methyl-Δ⁴-pregnene-11β,14α,17α,21-tetrol-3,20-dione
9α-methoxy-21-methyl-Δ⁴-pregnene-11β,14α,17α,21-tetrol-3,20-dione
9α-ethoxy-21-methyl-Δ⁴-pregnene-11β,14α,17α,21-tetrol-3,20-dione 21-methyl-Δ⁴-pregnene-14α,17α,21-triol-3,11,20-trione
9α-fluoro-21-methyl-Δ⁴-pregnene-14α,17α,21-triol-3,11,20-trione
9α-chloro-21-methyl-Δ⁴-pregnene-14α,17α,21-triol-3,11,20-trione
9α-bromo-21-methyl-Δ⁴-pregnene-14α,17α,21-triol-3,11,20-trione
9α-iodo-21-methyl-Δ⁴-pregnene-14α,17α,21-triol-3,11,20-trione
9α-methoxy-21-methyl-Δ⁴-pregnene-14α,17α,21-triol-3,11,20-trione
9α-ethoxy-21-methyl-Δ⁴-pregnene-14α,17α,21-triol-3,11,20-trione 21-methyl-Δ⁴-pregnene-11β,16α,17α,21-tetrol-3,20-dione
9α-fluoro-21-methyl-Δ⁴-pregnene-11β,16α,17α,21-tetrol-3,20-dione
9α-chloro-21-methyl-Δ⁴-pregnene-11β,16α,17α,21-tetrol-3,20-dione
9α-bromo-21-methyl-Δ⁴-pregnene-11β,16α,17α,21-tetrol-3,20-dione
9α-iodo-21-methyl-Δ⁴-pregnene-11β,16α,17α,21-tetrol-3,20-dione
9α-methoxy-21-methyl-Δ⁴-pregnene-11β,16α,17α,21-tetrol-3,20-dione
9α-ethoxy-21-methyl-Δ⁴-pregnene-11β,16α,17α,21-tetrol-3,20-dione 21-methyl-Δ⁴-pregnene-16α,17α,21-triol-3,11,20-trione
9α-fluoro-21-methyl-Δ⁴-pregnene-16α,17α,21-triol-3,11,20-trione
9α-chloro-21-methyl-Δ⁴-pregnene-16α,17α,21-triol-3,11,20-trione
9α-bromo-21-methyl-Δ⁴-pregnene-16α,17α,21-triol-3,11,20-trione
9α-iodo-21-methyl-Δ⁴-pregnene-16α,17α,21-triol-3,11,20-trione
9α-methoxy-21-methyl-Δ⁴-pregnene-16α,17α,21-triol-3,11,20-trione
9α-ethoxy-21-methyl-Δ⁴-pregnene-16α,17α,21-triol-3,11,20-trione 9α-chloro-21-methyl-Δ¹,⁴-pregnadiene-11β,17α,21-triol-3,20-dione
9α-iodo-21-methyl-Δ¹,⁴-pregnadiene-11β,17α,21-triol-3,20-dione
9α-bromo-21-methyl-Δ¹,⁴-pregnadiene-11β,17α,21-triol-3,20-dione
9α-methoxy-21-methyl-Δ¹,⁴-pregnadiene-11β,17α-diol-3,20-dione
9α-ethoxy-21-methyl-Δ¹,⁴-pregnadiene-11β,17α,21-triol-3,20-dione 21-methyl-Δ¹,⁴-pregnadiene-17α,21-diol-3,11,20-trione
9α-fluoro-21-methyl-Δ¹,⁴-pregnadiene-17α,21-diol-3,11,20-trione
9α-chloro-21-methyl-Δ¹,⁴-pregnadiene-17α,21-diol-3,11,20-trione
9α-bromo-21-methyl-Δ¹,⁴-pregnadiene-17α,21-diol-3,11,20-trione
9α-iodo-21-methyl-Δ¹,⁴-pregnadiene-17α,21-diol-3,11,20-trione
9α-methoxy-21-methyl-Δ¹,⁴-pregnadiene-17α,21-diol-3,11,20-trione
9α-ethoxy-21-methyl-Δ¹,⁴-pregnadiene-17α,21-diol-3,11,20-trione 2,21-dimethyl-Δ¹,⁴-pregnadiene-11β,17α,21-triol-3,20-dione 2,21-dimethyl-9α-fluoro-Δ$^{1,4}$-pregnadiene-11β,17α,21-triol-3,20-dione
2,21-dimethyl-9α-chloro-Δ$^{1,4}$-pregnadiene-11β,17α,21-triol-3,20-dione
2,21-dimethyl-9α-bromo-Δ$^{1,4}$-pregnadiene-11β,17α,21-triol-3,20-dione
2,21-dimethyl-9α-iodo-Δ$^{1,4}$-pregnadiene-11β,17α,21-triol-3,20-dione
2,21-dimethyl-9α-methoxy-Δ$^{1,4}$-pregnadiene-11β,17α,21-triol-3,20-dione
2,21-dimethyl-9α-ethoxy-Δ$^{1,4}$-pregnadiene-11β-17α,21-triol-3,20-dione 2,21-dimethyl-Δ$^{1,4}$-pregnadiene-17α,21-diol-3,11,20-trione
2,21-dimethyl-9α-fluoro-Δ$^{1,4}$-pregnadiene-17α,21-diol-3,11,20-trione
2,21-dimethyl-9α-chloro-Δ$^{1,4}$-pregnadiene-17α,21-diol-3,11,20-trione
2,21-dimethyl-9α-bromo-Δ$^{1,4}$-pregnadiene-17α,21-diol-3,11,20-trione
2,21-dimethyl-9α-iodo-Δ$^{1,4}$-pregnadiene-17α,21-diol-3,11,20-trione
2,21-dimethyl-9α-methoxy-Δ$^{1,4}$-pregnadiene-17α,21-diol-3,11,20-trione
2,21-dimethyl-9α-ethoxy-Δ$^{1,4}$-pregnadiene-17α,21-diol-3,11,20-trione 6α,21-dimethyl-Δ$^{1,4}$-pregnadiene-11β,17α,21-triol-3,20-dione
6α,21-dimethyl-9α-fluoro-Δ$^{1,4}$-pregnadiene-11β,17α,21-triol-3,20-dione
6α,21-dimethyl-9α-chloro-Δ$^{1,4}$-pregnadiene-11β,17α,21-triol-3,20-dione
6α,21-dimethyl-9α-iodo-Δ$^{1,4}$-pregnadiene-11β,17α,21-triol-3,20-dione
6α,21-dimethyl-9α-bromo-Δ$^{1,4}$-pregnadiene-11β,17α-triol-3,20-dione
6α,21-dimethyl-9α-methoxy-Δ$^{1,4}$-pregnadiene-11β,17α,21-triol-3,20-dione
6α,21-dimethyl-9α-ethoxy-Δ$^{1,4}$-pregnadiene-11β,17α,21-triol-3,20-dione 6α,21-dimethyl-Δ$^{1,4}$-pregnadiene-17α,21-diol-3,11,20-trione
6α,21-dimethyl-9α-fluoro-Δ$^{1,4}$-pregnadiene-17α,21-diol-3,11,20-trione
6α,21-dimethyl-9α-chloro-Δ$^{1,4}$-pregnadiene-17α,21-diol-3,11,20-trione
6α,21-dimethyl-9α-bromo-Δ$^{1,4}$-pregnadiene-17α,21-diol-3,11,20-trione
6α,21-dimethyl-9α-iodo-Δ$^{1,4}$-pregnadiene-17α,21-diol-3,11,20-trione
6α,21-dimethyl-9α-methoxy-Δ$^{1,4}$-pregnadiene-17α,21-diol-3,11,20-trione
6α,21-dimethyl-9α-ethoxy-Δ$^{1,4}$-pregnadiene-17α,21-diol-3,11,20-trione 21-methyl-Δ$^{1,4}$-pregnadiene-11β,14α,17α,21-tetrol-3,20-dione
9α-fluoro-21-methyl-Δ$^{1,4}$-pregnadiene-11β,14α,17α,21-tetrol-3,20-dione
9α-chloro-21-methyl-Δ$^{1,4}$-pregnadiene-11β,14α,17α,21-tetrol-3,20-dione
9α-bromo-21-methyl-Δ$^{1,4}$-pregnadiene-11β,14α,17α,21-tetrol-3,20-dione
9α-iodo-21-methyl-Δ$^{1,4}$-pregnadiene-11β,14α,17α,21-tetrol-3,20-dione
9α-methoxy-21-methyl-Δ$^{1,4}$-pregnadiene-11β,14α,17α,21-tetrol-3,20-dione
9α-ethoxy-21-methyl-Δ$^{1,4}$-pregnadiene-11β,14α,17α,21-tetrol-3,20-dione 21-methyl-Δ$^{1,4}$-pregnadiene-14α,17α,21-triol-3,11,20-trione
9α-fluoro-21-methyl-Δ$^{1,4}$-pregnadiene-14α,17α,21-triol-3,11,20-trione
9α-chloro-21-methyl-Δ$^{1,4}$-pregnadiene-14α,17α,21-triol-3,11,20-trione
9α-bromo-21-methyl-Δ$^{1,4}$-pregnadiene-14α,17α,21-triol-3,11,20-trione
9α-iodo-21-methyl-Δ$^{1,4}$-pregnadiene-14α,17α,21-triol-3,11,20-trione
9α-methoxy-21-methyl-Δ$^{1,4}$-pregnadiene-14α,17α,21-triol-3,11,20-trione
9α-ethoxy-21-methyl-Δ$^{1,4}$-pregnadiene-14α,17α,21-triol-3,11,20-trione 21-methyl-Δ$^{1,4}$-pregnadiene-11β,16α,17α,21-tetrol-3,20-dione
9α-fluoro-21-methyl-Δ$^{1,4}$-pregnadiene-11β,16α,17α,21-tetrol-3,20-dione
9α-chloro-21-methyl-Δ$^{1,4}$-pregnadiene-11β,16α,17α,21-tetrol-3,20-dione
9α-bromo-21-methyl-Δ$^{1,4}$-pregnadiene-11β,16α,17α,21-tetrol-3,20-dione
9α-iodo-21-methyl-Δ$^{1,4}$-pregnadiene-11β,16α,17α,21-tetrol-3,20-dione
9α-methoxy-21-methyl-Δ$^{1,4}$-pregnadiene-11β,16α,17α,21-tetrol-3,20-dione
9α-ethoxy-21-methyl-Δ$^{1,4}$-pregnadiene-11β,16α,17α,21-tetrol-3,20-dione 21-methyl-Δ$^{1,4}$-pregnadiene-16α,17α,21-triol-3,11,20-trione
9α-fluoro-21-methyl-Δ$^{1,4}$-pregnadiene-16α,17α,21-triol-3,11,20-trione
9α-chloro-21-methyl-Δ$^{1,4}$-pregnadiene-16α,17α,21-triol-3,11,20-trione
9α-bromo-21-methyl-Δ$^{1,4}$-pregnadiene-16α,17α,21-triol-3,11,20-trione
9α-iodo-21-methyl-Δ$^{1,4}$-pregnadiene-16α,17α,21-triol-3,11,20-trione
9α-methoxy-21-methyl-Δ$^{1,4}$-pregnadiene-16α,17α,21-triol-3,11,20-trione
9α-ethoxy-21-methyl-Δ$^{1,4}$-pregnadiene-16α,17α,21-triol-3,11,20-trione 21-methyl-Δ$^{4,6}$-pregnadiene-11β,17α,21-triol-3,20-dione
9α-fluoro-21-methyl-Δ$^{4,6}$-pregnadiene-11β,17α,21-triol-3,20-dione
9α-chloro-21-methyl-Δ$^{4,6}$-pregnadiene-11β,17α,21-triol-3,20-dione
9α-iodo-21-methyl-Δ$^{4,6}$-pregnadiene-11β,17α,21-triol-3,20-dione
9α-bromo-21-methyl-Δ$^{4,6}$-pregnadiene-11β,17α,21-triol-3,20-dione
9α-methoxy-21-methyl-Δ$^{4,6}$-pregnadiene-11β,17α,21-triol-3,20-dione
9α-ethoxy-21-methyl-Δ$^{4,6}$-pregnadiene-11β,17α,21-triol-3,20-dione 21-methyl-Δ$^{4,6}$-pregnadiene-17α,21-diol-3,20-dione
9α-fluoro-21-methyl-Δ$^{4,6}$-pregnadiene-17α,21-diol-3,20-dione
9α-chloro-21-methyl-Δ$^{4,6}$-pregnadiene-17α,21-diol-3,20-dione
9α-ethoxy-21-methyl-Δ$^{4,6}$-pregnadiene-17α,21-diol-3,11,20-trione
9α-iodo-21-methyl-Δ$^{4,6}$-pregnadiene-17α,21-diol-3,11,20-trione
9α-methoxy-21-methyl-Δ$^{4,6}$-pregnadiene-17α,21-diol-3,11,20-trione
9α-ethoxy-21-methyl-Δ$^{4,6}$-pregnadiene-17α,21-diol-3,11,20-trione 2α,21-dimethyl-Δ$^{4,6}$-pregnadiene-11β,17α,21-triol-3,20-dione
2α,21-dimethyl-9α-fluoro-Δ$^{4,6}$-pregnadiene-11β,17α,21-triol-3,20-dione
2α-21-dimethyl-9α-chloro-Δ$^{4,6}$-pregnadiene-11β,17α,21-triol-3,20-dione 2α,21-dimethyl-9α-bromo-Δ$^{4,6}$-pregnadiene-11β,17α,21-triol-3,20-dione
2α,21-dimethly-9α-iodo-Δ$^{4,6}$-pregnadiene-11β,17α,-21-triol-3,20-dione
2α,21-dimethyl-9α-methoxy-Δ$^{4,6}$-pregnadiene-11β,17α,21-triol-3,20-dione
2α,21-dimethyl-9α-ethoxy-Δ$^{4,6}$-pregnadiene-11β,17α,21-triol-3,20-dione 2α,21-dimethyl-Δ$^{4,6}$-pregnadiene-17α,21-diol-3,11,20-trione
2α,21-dimethyl-9α-fluoro-Δ$^{4,6}$-pregnadiene-17α,21-diol-3,11,20-trione
2α,21-dimethyl-9α-chloro-Δ$^{4,6}$-pregnadiene-17α,21-diol-3,11,20-trione
2α,21-dimethyl-9α-bromo-Δ$^{4,6}$-pregnadiene-17α,21-diol-3,11,20-trione
2α,21-dimethyl-9α-iodo-Δ$^{4,6}$-pregnadiene-17α,21-diol-3,11,20-trione
2α,21-dimethyl-9α-methoxy-Δ$^{4,6}$-pregnadiene-17α,21-diol-3,11,20-trione
2α,21-dimethyl-9α-ethoxy-Δ$^{4,6}$-pregnadiene-17α,21-diol-3,11,20-trione 6,21-dimethyl-Δ$^{4,6}$-pregnadiene-11β,17α,21-triol-3,20-dione
6,21-dimethyl-9α-fluoro-Δ$^{4,6}$-pregnadiene-11β,17α,21-triol-3,20-dione
6,21-dimethyl-9α-chloro-Δ$^{4,6}$-pregnadiene-11β,17α,21-triol-3,20-dione
6,21-dimethyl-9α-iodo-Δ$^{4,6}$-pregnadiene-11β,17α,21-triol-3,20-dione
6,21-dimethyl-9α-bromo-Δ$^{4,6}$-pregnadiene-11β,17α,21-triol-3,20-dione
6,21-dimethyl-9α-methoxy-Δ$^{4,6}$-pregnadiene-11β,17α,21-triol-3,20-dione
6,21-dimethyl-9α-ethoxy-Δ$^{4,6}$-pregnadiene-11β,17α,21-triol-3,20-dione 6,21-dimethyl-Δ$^{4,6}$-pregnadiene-17α,21-diol-3,11,20-trione
6,21-dimethyl-9α-fluoro-Δ$^{4,6}$-pregnadiene-17α,21-diol-3,11,20-trione
6,21-dimethyl-9α-chloro-Δ$^{4,6}$-pregnadiene-17α,21-diol-3,11,20-trione
6,21-dimethyl-9α-bromo-Δ$^{4,6}$-pregnadiene-17α,21-diol-3,11,20-trione
6,21-dimethyl-9α-iodo-Δ$^{4,6}$-pregnadiene-17α,21-diol-3,11,20-trione
6,21-dimethyl-9α-methoxy-Δ$^{4,6}$-pregnadiene-17α,21-diol-3,11,20-trione
6,21-dimethyl-9α-ethoxy-Δ$^{4,6}$-pregnadiene-17α,21-diol-3,11,20-trione 21-methyl-Δ$^{4,6}$-pregnadiene-11β,14α,17α,21-tetrol-3,20-dione
9α-fluoro-21-methyl-Δ$^{4,6}$-pregnadiene-11β,14α,17α,21-tetrol 3,20-dione
9α-chloro-21-methyl-Δ$^{4,6}$-pregnadiene-11β,14α,17α,21-tetrol-3,20-dione
9α-bromo-21-methyl-Δ$^{4,6}$-pregnadiene-11β,14α,17α,21-tetrol-3,20-dione
9α-iodo-21-methyl-Δ$^{4,6}$-pregnadiene-11β,14α,17α,21-tetrol-3,20-dione
9α-methoxy-21-methyl-Δ$^{4,6}$-pregnadiene-11β,14α,17α,21-tetrol 3,20-dione
9α-ethoxy-21-methyl-Δ$^{4,6}$-pregnadiene-11β,14α,17α,21-tetrol 3,20-dione 21-methyl-Δ$^{4,6}$-pregnadiene-14α,17α,21-triol-3,11,20-trione
9α-fluoro-21-methyl-Δ$^{4,6}$-pregnadiene-14α,17α,21-triol-3,11,20-trione
9α-chloro-21-methyl-Δ$^{4,6}$-pregnadiene-14α,17α,21-triol-3,11,20-trione
9α-bromo-21-methyl-Δ$^{4,6}$-pregnadiene-14α,17α,21-triol-3,11,20-trione
9α-iodo-21-methyl-Δ$^{4,6}$-pregnadiene-14α,17α,21-triol-3,11,20-trione
9α-methoxy-21-methyl-Δ$^{4,6}$-pregnadiene-14α,17α,21-triol-3,11,20-trione
9α-ethoxy-21-methyl-Δ$^{4,6}$-pregnadiene-14α,17α,21-triol-3,11,20-trione 21-methyl-Δ$^{4,6}$-pregnadiene-11β,16α,17α,21-tetrol-3,20-dione
9α-fluoro-21-methyl-Δ$^{4,6}$-pregnadiene-11β,16α,17α,21-tetrol 3,20-dione
9α-chloro-21-methyl-Δ$^{4,6}$-pregnadiene-11β,16α,17α,21-tetrol 3,20-dione
9α-bromo-21-methyl-Δ$^{4,6}$-pregnadiene-11β,16α,17α,21-tetrol 3,20-dione
9α-iodo-21-methyl-Δ$^{4,6}$-pregnadiene-11β,16α,17α,21-tetrol 3,20-dione
9α-methoxy-21-methyl-Δ$^{4,6}$-pregnadiene-11β,16α,17α,21-tetrol 3,20-dione
9α-ethoxy-21-methyl-Δ$^{4,6}$-pregnadiene-11β,16α,17α,21-tetrol 3,20-dione 21-methyl-Δ$^{4,6}$-pregnadiene-16α,17α,21-triol-3,11,20-trione
9α-fluoro-21-methyl-Δ$^{4,6}$-pregnadiene-16α,17α,21-triol-3,11,20-trione
9α-chloro-21-methyl-Δ$^{4,6}$-pregnadiene-16α,17α,21-triol-3,11,20-trione
9α-bromo-21-methyl-Δ$^{4,6}$-pregnadiene-16α,17α,21-triol-3,11,20-trione
9α-methoxy-21-methyl-Δ$^{4,6}$-pregnadiene-16α,17α,21-triol 3,11,20-trione
9α-ethoxy-21-methyl-Δ$^{4,6}$-pregnadiene-16α,17α,21-triol 3,11,20-trione 21-methyl-Δ$^{1,4,6}$-pregnatriene-11β,17α,21-triol-3,20-dione
9α-fluoro-21-methyl-Δ$^{1,4,6}$-pregnadiene-11β,17α,21-triol-3,20-dione
9α-chloro-21-methyl-Δ$^{1,4,6}$-pregnatriene-11β,17α,21-triol-3,20-dione
9α-iodo-21-methyl-Δ$^{1,4,6}$-pregnatriene-11β,17α,21-triol-3,20-dione
9α-bromo-21-methyl-Δ$^{1,4,6}$-pregnatriene-11β,17α,21-triol 3,20-dione
9α-methoxy-21-methyl-Δ$^{1,4,6}$-pregnatriene-11β,17α,21-triol-3,20-dione
9α-ethoxy-21-methyl-Δ$^{1,4,6}$-pregnatriene-11β,17α,21-triol-3,20-dione 21-methyl-Δ$^{1,4,6}$-pregnatriene-17α,21-diol-3,11,20-trione
9α-fluoro-21-methyl-Δ$^{1,4,6}$-pregnatriene-17α,21-diol-3,11,20-trione
9α-chloro-21-methyl-Δ$^{1,4,6}$-pregnatriene-17α,21-diol-3,11,20-trione
9α-bromo-21-methyl-Δ$^{1,4,6}$-pregnatriene-17α,21-diol-3,11,20-trione
9α-iodo-21-methyl-Δ$^{1,4,6}$-pregnatriene-17α,21-diol-3,11,20-trione
9α-methoxy-21-methyl-Δ$^{1,4,6}$-pregnatriene-17α,21-diol-3,11,20-trione
9α-ethoxy-21-methyl-Δ$^{1,4,6}$-pregnatriene-17α,21-diol-3,11,20-trione 2,21-dimethyl-Δ$^{1,4,6}$-pregnatriene-11β,17α,21-triol-3,20-dione
2,21-dimethyl-9α-fluoro-Δ$^{1,4,6}$-pregnatriene-11β,17α,21-triol-3,20-dione
2,21-dimethyl-9α-chloro-Δ$^{1,4,6}$-pregnatriene-11β,17α,21-triol-3,20-dione
2,21-dimethyl-9α-bromo-Δ$^{1,4,6}$-pregnatriene-11β,17α,21-triol-3,20-dione
2,21-dimethyl-9α-iodo-Δ$^{1,4,6}$-pregnatriene-11β,17α,21-triol-3,20-dione 2,21-dimethyl-9α-methoxy-Δ$^{1,4,6}$-pregnatriene-11β,17α,21-triol-3,20-dione
2,21-dimethyl-9α-ethoxy-Δ$^{1,4,6}$-pregnatriene-11β,17α,21-triol-3,20-dione 2,21-dimethyl-Δ$^{1,4,6}$-pregnatriene-17α,21-triol,3,11,20-trione
2,21-dimethyl-9α-fluoro-Δ$^{1,4,6}$-pregnatriene-17α,21-triol,3,11,20-trione
2,21-dimethyl-9α-chloro-Δ$^{1,4,6}$-pregnatriene-17α,21-triol-3,11,20-trione
2,21-dimethyl-9α-bromo-Δ$^{1,4,6}$-pregnatriene-17,21-triol-3,11,20-trione
2,21-dimethyl-9α-iodo-Δ$^{1,4,6}$-pregnatriene-17α,21-triol-3,11,20-trione
2,21-dimethyl-9α-methoxy-Δ$^{1,4,6}$-pregnatriene-17α,21-triol-3,11,20-trione
2,21-dimethyl-9α-ethoxy-Δ$^{1,4,6}$-pregnatriene-17α,21-triol-3,11,20-trione 6,21-dimethyl-Δ$^{1,4,6}$-pregnatriene-11β,17α,21-triol-3,20-dione
6,21-dimethyl-9α-fluoro-Δ$^{1,4,6}$-pregnatriene-11β,17α,21-triol-3,20-dione
6,21-dimethyl-9α-chloro-Δ$^{1,4,6}$-pregnatriene-11β-17α,21-triol-3,20-dione
6,21-dimethyl-9α-bromo-Δ$^{1,4,6}$-pregnatriene-11β,17α,21-triol-3,20-dione
6,21-dimethyl-9α-iodo-Δ$^{1,4,6}$-pregnatriene-11β,17α,21-triol-3,20-dione
6,21-dimethyl-9α-methoxy-Δ$^{1,4,6}$-pregnatriene-11β,17α,21-triol-3,20-dione
6,21-dimethyl-9α-ethoxy-Δ$^{1,4,6}$-pregnatriene-11β,17α,21-triol-3,20-dione 6,21-dimethyl-Δ$^{1,4,6}$-pregnatriene-17α,21-diol-3,11,20-trione
6,21-dimethyl-9α-fluoro-Δ$^{1,4,6}$-pregnatriene-17α,21-diol-3,11,20-trione
6,21-dimethyl-9α-chloro-Δ$^{1,4,6}$-pregnatriene-17α,21-diol-3,11,20-trione
6,21-dimethyl-9α-bromo-Δ$^{1,4,6}$-pregnatriene-17α,21-diol-3,11,20-trione
6,21-dimethyl-9α-iodo-Δ$^{1,4,6}$-pregnatriene-17α,21-diol-3,11,20-trione
6,21-dimethyl-9α-methoxy-Δ$^{1,4,6}$-pregnatriene-17α,21-diol-3,11,20-trione
6,21-dimethyl-9α-ethoxy-Δ$^{1,4,6}$-pregnatriene-17α,21-diol-3,11,20-trione 21-methyl-Δ$^{1,4,6}$-pregnatriene-11β,14α,17α,21-tetrol-3,20-dione
9α-fluoro-21-methyl-Δ$^{1,4,6}$-pregnatriene-11β,14α,21-tetrol-3,20-dione
9-chloro-21-methyl-Δ$^{1,4,6}$-pregnatriene-11β,14α,17α,21-tetrol-3,20-dione
9α-bromo-21-methyl-Δ$^{1,4,6}$-pregnatriene-11β,14α,21-tetrol-3,20-dione
9α-iodo-21-methyl-Δ$^{1,4,6}$-pregnatriene-11β,14α,17α,21-tetrol-3,20-dione
9α-methoxy-21-methyl-Δ$^{,4,6}$-pregnatriene-11β,14α,17α,21-tetrol-3,20-dione
9α-ethoxy-21-methyl-Δ$^{1,4,6}$-pregnatriene-11β,14α,17α,21-tetrol-3,20-dione 21-methyl-Δ$^{1,4,6}$-pregnatriene-14α,17α,21-triol-11,3,20-trione
9α-fluoro-21-methyl-Δ$^{1,4,6}$-pregnatriene-14α,17α,21-triol-3,11,20-trione
9α-chloro-21-methyl-Δ$^{1,4,6}$-pregnatriene-14α,17α,21-triol-3,11,20-trione
9α-bromo-21-methyl-Δ$^{1,4,6}$-pregnatriene-14α,17α,21-triol-3,11,20-trione
9α-iodo-21-methyl-Δ$^{1,4,6}$-pregnatriene-14α,17α,21-triol-3,11,20-trione 9α-methoxy-21-methyl-Δ$^{1,4,6}$-pregnatriene-14α,17α,21-triol-3,11,20-trione
9α-ethoxy-21-methyl-Δ$^{1,4,6}$-pregnatriene-14α,17α,21-triol-3,11,20-trione 21-methyl-Δ$^{1,4,6}$-pregnatriene-11β,16α,17α,21-tetrol-3,20-dione
9α-fluoro-21-methyl-Δ$^{1,4,6}$-pregnatriene-11β,16α,17α,21-tetrol-3,20-dione
9α-chloro-21-methyl-Δ$^{1,4,6}$-pregnatriene-11β,,16α,17α,21-tetrol-3,20-dione
9α-bromo-21-methyl-Δ$^{1,4,6}$-pregnatriene-11β,16α,17α,21-tetrol-3,20-dione
9α-methoxy-21-methyl-Δ$^{1,4,6}$-pregnatriene-11β,16α,17α,21-tetrol-3,20-dione
9α-ethoxy-21-methyl-Δ$^{1,4,6}$-pregnatriene-11β,16α,17α,21-tetrol-3,20-dione 21-methyl-Δ$^{1,4,6}$-pregnatriene-16α,17α,21-triol-3,11,20-trione
9α-fluoro-2-methyl-Δ$^{1,4,6}$-pregnatriene-16α,17α,21-triol-3,11,20-trione
9α-chloro-21-methyl-Δ$^{1,4,6}$-pregnatriene-16α,17α,21-triol-3,11,20-trione
9α-bromo-21-methyl-Δ$^{1,4,6}$-pregnatriene-16α,17α,21-triol-3,11,20-trione
9α-iodo-21-methyl-Δ$^{1,4,6}$-pregnatriene-16α,17α21-triol-3,11,20-trione
9α-methoxy-21-methyl-Δ$^{1,4,6}$-pregnatriene-16α,17α,21-triol-3,11,20-trione
9α-ethoxy-21-methyl-Δ$^{1,4,6}$-pregnatriene-16α,17α,21-triol-3,11,20-trione 6α,9α-difluoro-21-methyl-Δ$^4$-pregnene-11β,17α,21-triol-3,20-dione
6α-fluoro-9α-chloro-21-methyl-Δ$^4$-pregnene-11β,17α,21-triol-3,20-dione
6α-fluoro-9α-bromo-21-methyl-Δ$^4$-pregnene-11β,17α,21-triol-3,20-dione
6-fluoro-9-iodo-21-methyl-Δ$^4$-pregnene-11β,17α,21-triol-3,20-dione
6α-fluoro-9α-methoxy-21-methyl-Δ$^4$-pregnene-11β,17α,21-triol-3,20-dione
6α-fluoro-9α-ethoxy-21-methyl-Δ$^4$-pregnene-11β,17α,21-triol-3,20-dione 6α-fluoro-21-methyl-Δ$^4$-pregnene-17α,21-diol-3,20-trione
6α,9α-difluoro-21-methyl-Δ$^4$-pregnene-17α,21-diol-3,20-trione
6α-fluoro-9α-chloro-21-methyl-Δ$^4$-pregnene-17α,21-diol-3,11,20-trione
6α-fluoro-9α-bromo-21-methyl-Δ$^4$-pregnene-17α,21-diol-3,11,20-trione
6α-fluoro-9α-iodo-21-methyl-Δ$^4$-pregnene-17,21-diol-3,11,20-trione
6α-fluoro-9α-methoxy-Δ$^4$-pregnene-17α,21-diol-3,11,20-trione
6α-fluoro-9α-ethoxy-21-methyl-Δ$^4$-pregnene-17α,21-diol-3,11,20-trione 6α-fluoro-21-methyl-Δ$^4$-pregnene-11β,17α,21-triol-3,20-dione
6α,9α-difluoro-21-methyl-Δ$^4$-pregnene-11β,17α,21-triol-3,20-dione
6α-fluoro-9α-chloro-21-methyl-Δ$^4$-pregnene-11β,17α,21-triol-3,20-dione
6α-fluoro-9α-bromo-21-methyl-Δ$^4$-pregnene-11β,17α,21-triol-3,20-dione
6α-fluoro-9α-diodo-21-methyl-Δ$^4$-pregnene-11β,17α,21-triol-3,20-dione
6α-fluoro-9α-methoxy-21-methyl-Δ$^4$-pregnene-11β,17α,21-triol-3,20-dione
6α-fluoro-9α-ethoxy-21-methyl-Δ$^4$-pregnene-11β,17α,21-triol-3,20-dione 6α-fluoro-9α-iodo-21-methyl-Δ$^{1,4}$-pregnadiene-17α,21-diol-3,11,20-trione
6α-fluoro-9α-methoxy-21-methyl-Δ$^{1,4}$-pregnadiene-17α,21-diol-3,11,20-trione
6α-fluoro-9α-methoxy-21-methyl-Δ$^{1,4}$-pregnadiene-17α,21-diol-3,11,20-trione 6α-fluoro-21-methyl-Δ$^{1,4}$-pregnadiene-11β,17α,21-triol-3,20-dione
6α,9α-difluoro-21-methyl-Δ$^{1,4}$-pregnadiene-11β,17α,21-triol-3,20-dione
6α-fluoro-9α-chloro-21-methyl-Δ$^{1,4}$-pregnadiene-11β,17α,21-triol-3,20-dione
6α-fluoro-9α-bromo-21-methyl-Δ$^{1,4}$-pregnadiene-11β,17α,21-triol-3,20-dione
6α-fluoro-9α-iodo-21-methyl-Δ$^{1,4}$-pregnadiene-11β,17α,21-triol-3,20-dione
6α-fluoro-9α-methoxy-21-methyl-Δ$^{1,4}$-pregnadiene-11β,17α,21-triol-3,20-dione
6α-fluoro-9α-ethoxy-21-methyl-Δ$^{1,4}$-pregnadiene-11β,17α,21-triol-3,20-dione 6α-fluoro-21-methyl-Δ$^{1,4}$-pregnadiene-17α,21-diol-3,11,20-trione
6α,9α-difluoro-21-Δ$^{1,4}$-pregnadiene-17α,21-diol-3,11,20-trione
6α-fluoro-9α-chloro-21-methyl-Δ$^{1,4}$-pregnadiene-17α,21-diol-3,11,20-trione
6α-fluoro-9α-bromo-21-methyl-Δ$^{1,4}$-pregnadiene-17α,21-diol-3,11,20-trione 6α-chloro-21-methyl-Δ$^4$-pregnene-17α,21-diol-3,20-trione
6α-chloro-9α-fluoro-21-methyl-Δ$^4$-pregnene-17α,21-diol-3,11,20-trione
6α,9α-dichloro-21-methyl-Δ$^4$-pregnene-17α,21-diol-3,11,20-trione
6α-chloro-9α-bromo-21-methyl-Δ$^4$-pregnene-17α,21-diol-3,11,20-trione
6α-chloro-9α-iodo-21-methyl-Δ$^4$-pregnene-17α,21-diol-3,11,20-trione
6α-chloro-9α-methoxy-21-methyl-Δ$^4$-pregnene-17α,21-diol-3,11,20-trione
6α-chloro-9α-ethoxy-21-methyl-Δ$^4$-pregnene-17α,21-diol-3,11,20-trione 6α-chloro-21-methyl-Δ$^{1,4}$-pregnadiene-11β,17α,21-triol-3,20-dione
6α-chloro-9α-fluoro-21-methyl-Δ$^{1,4}$-pregnadiene-11β,17α,21-triol-3,20-dione
6α,9α-dichloro-21-methyl-Δ$^{1,4}$-pregnadiene-11β,17α,21-triol-3,20-dione
6α-chloro-9α-bromo-21-methyl-Δ$^{1,4}$-pregnadiene-11β,17α,21-triol-3,20-dione
6α-chloro-9α-iodo-21-methyl-Δ$^{1,4}$-pregnadiene-11β,17α,21-triol-3,20-dione
6α-chloro-9α-methoxy-21-methyl-Δ$^{1,4}$-pregnadiene-11β,17α,21-triol-3,20-dione
6α-chloro-9α-ethoxy-21-methyl-Δ$^{1,4}$-pregnadiene-11β,17α,21-triol-3,20-dione 9α-fluoro-16α,21-dimethyl-Δ$^4$-pregnene-11β,17α,21-triol-3,20-dione
9α-chloro-16α,21-dimethyl-Δ$^4$-pregnene-11β,17α,21-triol-3,20-dione
9α-bromo-16α,21-dimethyl-Δ$^4$-pregnene-11β,17α,21-triol-3,20-dione
9α-iodo-16α,21-dimethyl-Δ$^4$-pregnene-11β,17α,21-triol-3,20-dione
9α-methoxy-16α,21-dimethyl-Δ$^4$-pregnene-11β,17α,21-triol-3,20-dione
9α-ethoxy-16α,21-dimethyl-Δ$^4$-pregnene-11β,17α,21-triol-3,20-dione 16α,21-dimethyl-Δ$^4$-pregnene-17α,21-diol-3,11,20-trione
9α-fluoro-16α,21-dimethyl-Δ$^4$-pregnene-7α,21-diol-3,11,20-trione
9α-chloro-16α,21-dimethyl-Δ$^4$-pregnene-17α,21-diol-3,11,20-trione
9α-bromo-16α,21-dimethyl-Δ$^4$-pregnene-17α,21-diol-3,11,20-trione
9α-iodo-16α,21-dimethyl-Δ$^4$-pregnene-17α,21-diol-3,11,20-trione
9α-methoxy-16α,21-dimethyl-Δ$^4$-pregnene-17α,21-diol-3,11,20-trione
9α-ethoxy-16α,21-dimethyl-Δ$^4$-pregnene-17α,21-diol-3,11,20-trione 16α,21-dimethyl-Δ$^4$-pregnene-17α,21-diol-3,11,20-trione
9α-fluoro-16α,21-dimethyl-Δ$^4$-pregnene-7α,21-diol-3,11,20-trione
9α-chloro-16α,21-dimethyl-Δ$^4$-pregnene-17α,21-diol-3,11,20-trione
9α-bromo-16α,21-dimethyl-Δ$^4$-pregnene-17α,21-diol-3,11,20-trione
9α-iodo-16α,21-dimethyl-Δ$^4$-pregnene-17α,21-diol-3,11,20-trione
9α-methoxy-16α,21-dimethyl-Δ$^4$-pregnene-17α,21-diol-3,11,20-trione
9α-ethoxy-16α,21-dimethyl-Δ$^4$-pregnene-17α,21-diol-3,11,20-trione 16α,21-dimethyl-Δ$^4$-pregnene-11β,17α,21-triol-3,20-dione
9α-fluoro-16α,21-dimethyl-Δ$^4$-pregnene-11β,17α,21-triol-3,20-dione
9α-chloro-16α,21-dimethyl-Δ$^4$-pregnene-11β,17α,21-triol-3,20-dione
9α-bromo-16α,21-dimethyl-Δ$^4$-pregnene-11β,17α,21-triol-3,20-dione
9α-iodo-16α,21-dimethyl-Δ$^4$-pregnene-11β,17α,21-triol-3,20-dione
9α-methoxy-16α,21-dimethyl-Δ$^4$-pregnene-11β,17α,21-triol-3,20-dione
9α-ethoxy-16α,21-dimethyl-Δ$^4$-pregnene-11β,17α,21-triol-3,20-dione 16α,21-dimethyl-Δ$^{1,4}$-pregnadiene-11β,17α,21-triol-3,20-dione
9α-fluoro-16α,21-dimethyl-Δ$^{1,4}$-pregnadiene-11β,17α,21-triol-3,20-dione
9α-chloro-16α,21-dimethyl-Δ$^{1,4}$-pregnadiene-11β,17α,21-triol-3,20-dione
9α-bromo-16α,21-dimethyl-Δ$^{1,4}$-pregnadiene-11β,17α,21-triol-3,20-dione
9α-iodo-16α,21-dimethyl-Δ$^{1,4}$-pregnadiene-11β,17α,21-triol-3,20-dione
9α-methoxy-16α,21-dimethyl-Δ$^{1,4}$-pregnadiene-11β,17α,21-triol-3,20-dione
9α-ethoxy-16α,21-dimethyl-Δ$^{1,4}$-pregnadiene-11β,17α,21-triol-3,20-dione 16α,21-dimethyl-Δ$^{1,4}$-pregnadiene-17α,21-diol-3,11,20-trione
9α-fluoro-16α,21-dimethyl-Δ$^{1,4}$-pregnadiene-17α,21-diol-3,11,20-trione
9α-chloro-16α,21-dimethyl-Δ$^{1,4}$-pregnadiene-17α,21-diol-3,11,20-trione
9α-bromo-16α,21-dimethyl-Δ$^{1,4}$-pregnadiene-17α,21-diol-3,11,20-trione
9α-iodo-16α,21-dimethyl-Δ$^{1,4}$-pregnadiene-17α,21-diol-3,11,20-trione
9α-methoxy-16α,21-dimethyl-Δ$^{1,4}$-pregnadiene-17α,21-diol-3,11,20-trione
9α-ethoxy-16α,21-dimethyl-Δ$^{1,4}$-pregnadiene-17α,21-diol-3,11,20-trione 16α,21-dimethyl-Δ$^{1,4}$-pregnadiene-11β,17α,21-triol-3,20-dione
9α-fluoro-16α,21-dimethyl-Δ$^{1,4}$-pregnadiene-11β,17α,21-triol-3,20-dione
9α-chloro-16α,21-dimethyl-Δ$^{1,4}$-pregnadiene-11β,17α,21-triol-3,20-dione 9α-bromo-16α,21-dimethyl-$\Delta^{1,4}$-pregnadiene-11β,17α,21-triol-3,20-dione
9α-iodo-16α,2-dimethyl-$\Delta^{1,4}$-pregnadiene-11β,17α,21-triol-3,20-dione
9α-methoxy-16α,21-dimethyl-$\Delta^{1,4}$-pregnadiene-11β,17α,21-triol-3,20-dione
9α-ethoxy-6α,21-dimethyl-$\Delta^{1,4}$-pregnadiene-11β,17α,21-triol-3,20-dione 16α,21-dimethyl-$\Delta^{1,4}$-pregnadiene-17α,21-diol-3,11,20-trione
9α-fluoro-16α,21-dimethyl-$\Delta^{1,4}$-pregnadiene-17α,21-diol-3,11,20-trione
9α-chloro-16α,21-dimethyl-$\Delta^{1,4}$-pregnadiene-17α,21-diol-3,11,20-trione
9α-bromo-16α,21-dimethyl-$\Delta^{1,4}$-pregnadiene-17α,21-diol-3,11,20-trione
9α-iodo-16α,21-dimethyl-$\Delta^{1,4}$-pregnadiene-17α,21-diol-3,11,20-trione
9α-methoxy-16α,21-dimethyl-$\Delta^{1,4}$-pregnadiene-17α,21-diol-3,11,20-trione
9α-ethoxy-16α,21-dimethyl-$\Delta^{1,4}$-pregnadiene-17α,21-diol-3,11,20-trione 16α,21-dimethyl-$\Delta^{4,6}$-pregnadiene-11β,17α,21-triol-3,20-dione
9α-fluoro-16α,21-dimethyl-$\Delta^{4,6}$-pregnadiene-11β,17α,21-triol-3,20-dione
9α-chloro-16α,21-dimethyl-$\Delta^{4,6}$-pregnadiene-11β,17α,21-triol-3,20-dione
9α-bromo-16α,2-dimethyl-$\Delta^{4,6}$-pregnadiene-11β,17α,21-triol-3,20-dione
9α-iodo-16α,21-dimethyl-$\Delta^{4,6}$-pregnadiene-11β,71α,21-triol-3,20-dione
9α-methoxy-16α,21-dimethyl-$\Delta^{4,6}$-pregnadiene-11β,17α,21-triol 3,20-dione
9α-ethoxy-16α,21-dimethyl-$\Delta^{4,6}$-pregnadiene-11β,17α-triol-3,20-dione 16α,21-dimethyl-$\Delta^{4,6}$-pregnadiene-17α,21-diol-3,11,20-trione
9α-fluoro-16α,21-dimethyl-$\Delta^{4,6}$-prognadiene-17α,21-diol-3,11,20-trione
9α-chloro-16α,21-dimethyl-$\Delta^{4,6}$-pregnadiene-17α,21-diol-3,11,20-trione
9α-bromo-16α,21-dimethyl-$\Delta^{4,6}$-pregnadiene-17α,21-diol-3,11,20-trione
9α-iodo-16α,21-dimethyl-$\Delta^{4,6}$-pregnadiene-17α,21-diol-3,11,20-trione
9α-methoxy-16α,21-dimethyl-$\Delta^{4,6}$-pregnadiene-17α,21-diol-3,11,20-trione
9α-ethoxy-16α,21-dimethyl-$\Delta^{4,6}$-pregnadiene-17α21-diol-3,11,20-trione 16α,21-dimethyl-$\Delta^{4,6}$-pregnadiene-11β,17α,21-triol-3,20-dione
9α-fluoro-16α,21-dimethyl-$\Delta^{4,6}$-pregnadiene-11β,17α,21-triol-3,20-dione
9α-chloro-16α,21-dimethyl-$\Delta^{4,6}$-pregnadiene-11β,17α,21-triol-3,20-dione
9α-bromo-16α,21-dimethyl-$\Delta^{4,6}$-pregnadiene-11β,17α,21-triol-3,20-dione
9α-iodo-16α,21-dimethyl-$\Delta^{4,6}$-pregnadiene-11β,17α,21-triol-3,20-dione
9α-methoxy-16α,21-dimethyl-$\Delta^{4,6}$-pregnadiene-11β,17α,21-triol-3,20-dione
9α-ethoxy-16α,21-dimethyl-$\Delta^{4,6}$-pregnadiene-11β,17α,21-triol-3,20-dione 16α,21-dimethyl-$\Delta^{4,6}$-pregnadiene-17α,21-diol-3,11,20-trione
9α-fluoro-16α,21-dimethyl-$\Delta^{4,6}$-pregnadiene-17α,21-diol-3,11,20-trione
9α-chloro-16α,21-dimethyl-$\Delta^{4,6}$-pregnadiene-17α,21-diol-3,11,20-trione
9α-bromo-16α,21-dimethyl-$\Delta^{4,6}$-pregnadiene-17α,21-diol-3,11,2-trione
9α-iodo-16α,21-dimethyl-$\Delta^{4,6}$-pregnadiene-17α,21-diol-3,11,20-trione
9α-methoxy-16α,21-dimethyl-$\Delta^{4,6}$-pregnadiene-17α,21-diol-3,11,20-trione
9α-ethoxy-16α,21-dimethyl-$\Delta^{4,6}$-pregnadiene-17α,21-diol-3,11,20-trione 16α,21-dimethyl-$\Delta^{1,4,6}$-pregnatriene-11β,17α,21-triol-3,20-dione
9α-fluoro-16α,21-dimethyl-$\Delta^{1,4,6}$-pregnatriene-11β,17α,21-triol-3,20-dione
9α-chloro-16α,21-dimethyl-$\Delta^{1,4,6}$-pregnatriene-11β,17α,21-triol-3,20-dione
9α-bromo-16α,21-dimethyl-$\Delta^{1,4,6}$-pregnatriene-11β,17α,21-triol-3,20-dione
9α-iodo-16α,21-dimethyl-$\Delta^{1,4,6}$-pregnatriene 11β,17α,21-triol-3,20-dione
9α-methoxy-16α,21-dimethyl-$\Delta^{1,4,6}$-pregnatriene 11β,17α,21-triol-3,20-dione
9α-ethoxy-16α,21-dimethyl-$\Delta^{1,4,6}$-pregnatriene 11β,17α,21-triol-3,20-dione 16α,21-dimethyl-$\Delta^{1,4,6}$-pregnatriene-17α,21-diol-3,11,20-trione
9α-fluoro-16α,21-dimethyl-$\Delta^{1,4,6}$-pregnatriene-17α,21-diol-3,11,20-trione
9α-chloro-16α,21-dimethyl-$\Delta^{1,4,6}$-pregnatriene-17α,21-diol-3,11,20-trione
9α-bromo-16α,21-dimethyl-$\Delta^{1,4,6}$-pregnatriene-17α,21-diol-3,11,20-trione
9α-iodo-16α,21-dimethyl-$\Delta^{1,4,6}$-pregnatriene-17α,21-diol-3,11,20-trione
9α-methoxy-16α,21-dimethyl-$\Delta^{1,4,6}$-pregnatriene-17α,21-diol-3,11,20-trione
9α-ethoxy-16α,21-dimethyl-$\Delta^{1,4,6}$-pregnatriene-17α,21-diol-3,11,20-trione 16α,21-dimethyl-$\Delta^{1,4,6}$-pregnatriene-11β,17α,21-triol-3,20-dione
9α-fluoro-16α,21-dimethyl-$\Delta^{1,4,6}$-pregnatriene-11β,17α,21-triol-3,20-dione
9α-chloro-16α,21-dimethyl-$\Delta^{1,4,6}$-pregnatriene-11β,17α,21-triol-3,20-dione
9α-bromo-16α,21-dimethyl-$\Delta^{1,4,6}$-pregnatriene-11β,17α,21-triol-3,20-dione
9α-iodo-16α,21-dimethyl-$\Delta^{1,4,6}$-pregnatriene-11β,17α,21-triol-3,20-dione
9α-methoxy-16α,21-dimethyl-$\Delta^{1,4,6}$-pregnatriene-11β,17α,21-triol-3,20-dione
9α-ethoxy-16α,21-dimethyl-$\Delta^{1,4,6}$-pregnatriene-11β,17α,21-triol-3,20-dione 16α,21-dimethyl-$\Delta^{1,4,6}$-pregnatriene-17α,21-diol-3,11,20-trione
9α-fluoro-16α,21-dimethyl-$\Delta^{1,4,6}$-pregnatriene-17α,21-diol-3,11,20-trione
9α-chloro-16α,21-dimethyl-$\Delta^{1,4,6}$-pregnatriene-17α,21-diol-3,11,20-trione
9α-bromo-16α,21-dimethyl-$\Delta^{1,4,6}$-pregnatriene-17α,21-diol-3,11,20-trione
9α-iodo-16α,21-dimethyl-$\Delta^{1,4,6}$-pregnatriene-17α,21-diol-3,11,20-trione
9α-methoxy-16α,21-dimethyl-$\Delta^{1,4,6}$-pregnatriene-17α,21-diol-3,11,20-trione
9α-ethoxy-16α,21-dimethyl-$\Delta^{1,4,6}$-pregnatriene-17α,21-diol-3,11,20-trione As stated above, the B-isomer of compounds within the purview of this invention are prepared by reduction of the 17β-pyruvoyl compounds described and claimed in copending and concurrently filed patent application, Serial No. 4000 with yeast or with alkali metal hydrides.

Specific yeasts applicable to the process include yeasts of the genus Saccharomyces, for example, *Saccharomyces cerevisiae*. The reduction is carried out by standard means known in the art such as subjecting the starting material to the action of a growing culture of the yeast or to a suspension of yeast cells. Reduction with alkali metal hydrides such as sodium borohydride, potassium borohydride, lithium borohydride or sodium alkoxy borohydrides is carried out by subjecting the propanoyl compound to the action of the selected borohydride in a reaction inert organic solvent such as the lower alkanols, lower alkyl amines or pyridine at a temperature of from about minus 40° C. to about 25° C. for a period of from about 2½ to about 8 hours. Although in theory, the equimolar portion of the borohydride can be used, it is preferred to employ an excess of the reducing agent, say for example up to a 200% excess so as to insure complete reduction of the starting material.

The examples set forth below illustrate the application of both of these procedures to the preparation of the compounds of this invention.

*Example XV.—Yeast reduction*

A solution containing 500 mg. of 21-methyl-$\Delta^{1,4}$-pregnadiene-11$\beta$,17$\alpha$-diol-3,20,21-trione in 100 ml. of ethanol is added to a stirred solution of 200 grams of sucrose in 1500 ml. of water. A suspension containing 35 grams of *Saccharomyces cerevisiae* obtained by growing the microorganism in a suitable nutrient medium, filtering and drying the filtrate in 200 ml. of water was prepared in a separate vessel and maintained at aproximately 40° C. At the end of a one-hour period, the steroid solution was added to this suspension and the reaction mixture stirred gently so as to maintain anaerobic conditions. The reaction is continued for from 56 to 72 hours. During this time, the pH is maintained within the range of from about 4.5 to about 5.0 by the addition of 1.5 N ammonium hydroxide. At the end of the first twenty-four hours, an additional 40 grams of sucrose and 7 grams of *Saccharomyces cerevisiae* suspension in 34 ml. of water and 2 ml. of ethanol is added. At the end of a forty-eight hour period, an additional 7 grams of yeast in 34 ml. of water and 2 ml. of ethanol is added.

The desired material is isolated by extracting the filtrate from which the insolubles have been removed with 4 separate 250 ml. portions of chloroform. The combined chloroform extracts are washed twice with $\frac{1}{10}$ volumes of 5% aqueous sodium bicarbonate and again with a $\frac{1}{10}$ volume of water. The organic layer is separated, dried over anhydrous sodium sulfate, filtered and the desired product recovered by evaporating the filtrate in vacuo.

*Example XVI.—Borohydride reduction*

A solution containing 186 mg. of 21-methyl-$\Delta^{1,4}$-pregnadiene-11$\beta$,17$\alpha$-diol-3,20,21-trione in 15 ml. of methanol was prepared. To this solution there was added a mixture containing 13.3 mg. of sodium borohydride in 3.6 ml. of methanol and the mixture was allowed to stand at from 0 to 5° C. for 3 hours. The excess reducing agent was decomposed by the dropwise addition of dilute acetic acid. The mixture was filtered and the solvent removed in vacuo. The residue is taken up in chloroform, washed with water, the organic layer dried over anhydrous sodium sulfate, filtered and the desired product recovered by removal of the solvent in vacuo.

The product is best purified by conversion to the 21-acetate which crystallizes from solution quite readily. This may be accomplished by taking up the residue in a mixture containing 2 ml. of pyridine and 1 ml. of acetic anhydride. The mixture is then allowed to stand for 12 hours and the excess anhydride decomposed by the addition of water. The water precipitates the product and it may be recovered by filtration. It is, however, best to recover the product by extracting the mixure with chloroform. The resulting chloroform solution is washed successively with water, 2 N hydrochloric acid and again with water, the organic layer is dried over anhydrous sodium sulfate filtered and the solvent removed in vacuo to leave the product as a residue which is purified by trituration with ether.

Compounds within the purview of this invention having an 11-keto group are prepared by oxidation of the 11-hydroxy group. It will be recognized by those skilled in the art that in certain instances it will be possible to use starting materials already containing an 11-keto group. Alternatively, the final product itself may be oxidized. In all instances it is preferred to protect hydroxyl groups in other than the 11-position by esterification prior to oxidation of the 11-hydroxyl group. To do otherwise may lead to mixtures of products as a result of simultaneous oxidation of hydroxyl groups. The oxidations are effected by procedures well known in the art, including, for example, the use of chromium trioxide or the chromic acid-pyridine complex.

A variety of esters of the foregoing 16- and 21-hydroxylated compounds as well as esters of the 21-hydroxymethyl compounds are prepared in accordance with standard esterification procedures. The esters prepared include the formates, acetates, propionates, propenoates, butyrates, decanoates, hemisuccinates, hemiglutarates, toluates, citrates and cyclohexylpropionates. In those compounds having both a 16-hydroxyl and a 21-hydroxyl or 21-hydroxymethyl group, the esters prepared generally contain the same acyl group at both positions. There is no particular advantage in preparing diesters with diverse groups at the 16-and 21-positions, but if desired these can be prepared either by using 16-esterified steroid aldehyde as the starting compound or by careful hydrolysis and re-esterification using procedures well known in the art.

Alkali and alkaline earth metal salts of the acid esters are prepared by reaction of the said acid esters with the hydroxides or carbonates of the selected metal in accordance with standard procedures. These products have the advantage of increased solubility in water compared to the other compounds of this invention.

The following example is illustrative of two of the methods used to prepare the 16,17-acetonides of this invention, including those prepared from the compounds of the previous examples. Those prepared by these methods include the acetals and ketals from acetaldehyde, propionaldehyde, butyraldehyde, acetone, diisopropyl ketone, methyl ethyl ketone and di-n-butyl ketone.

21 - methyl - $\Delta^{1,4}$ - pregnadiene - 11$\beta$,16$\alpha$,17$\alpha$,21-tetrol-3,20-dione (100 mg.) was taken up in 100 ml. of acetone which had been previously dried over anhydrous potassium carbonate. To this mixture, there was added 495 mg. of anhydrous copper sulfate and the mixture was stirred at 20°–30° C. for two days. The mixture was filtered, dried over anhydrous potassium carbonate, again filtered and the excess solvent removed in vacuo. The residue was triturated with ether containing a few drops of acetone and the desired product recovered by filtration.

9$\alpha$ - fluoro - 21 - methyl - $\Delta^{1,4}$ - pregnadiene - 11$\beta$,16$\alpha$,17$\alpha$,21-tetrol-3,20-dione (350 mg.) was taken up in 25 ml. of propionaldehyde containing two drops of concentrated hydrochloric acid. The mixture was refluxed for 5 minutes and allowed to stand at 20°–30° C. for 8 hours. The desired product was precipitated by the addition of water and isolated by filtration.

As stated above, compounds of this invention are also prepared by a procedure which permits the preparation of both the A- and the B-isomer in pure form. The synthetic scheme set forth below illustrates the applicability of the process to the preparation of some of the compounds of this invention.

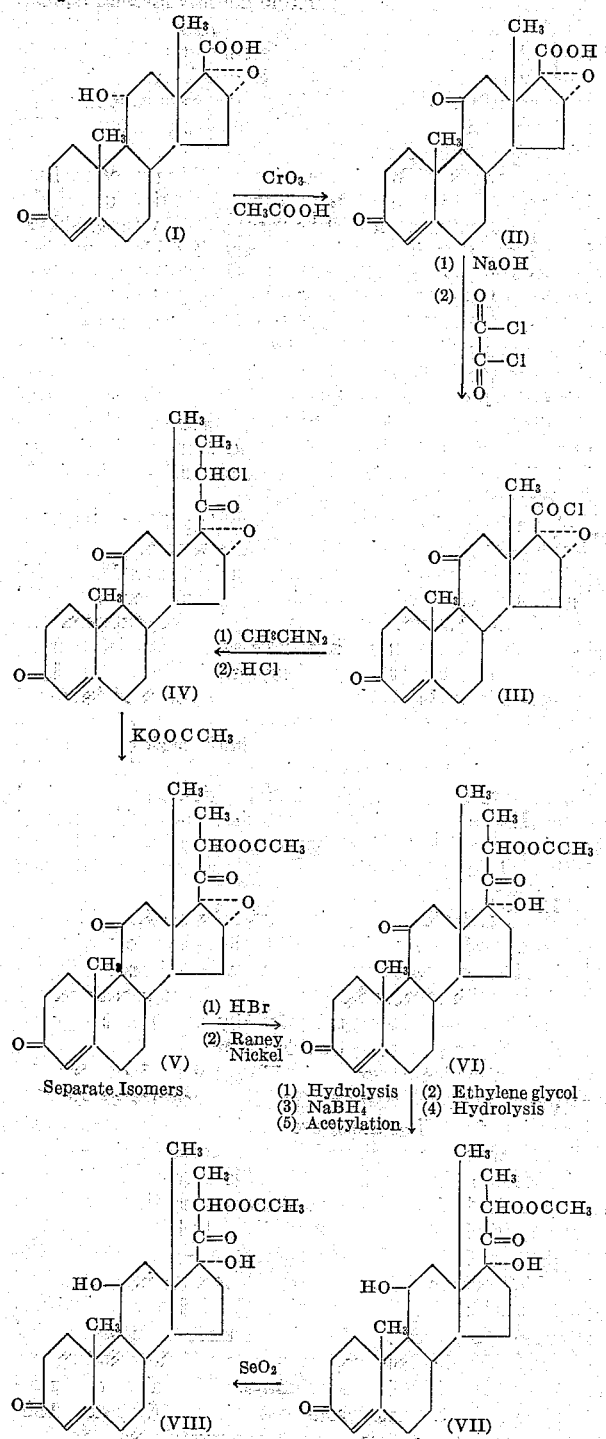

Compound I, 11α-hydroxy-16α,17α-epoxy-3-keto-Δ⁴-etiocholenic acid, is prepared from the known compound 16α,17α-epoxy-Δ⁴-pregnene-21-ol-3,20-dione 21-acetate by incubation with *Rhizopus nigricans* in accordance with the procedure of Peterson et al. as described in the Journal of the American Chemical Society, vol. 74, page 5933 (1952). The resulting compound is oxidized with periodic acid to convert the α-hydroxy acetyl group at the 17β-position to a carboxyl group. Oxidation of the 11α-hydroxyl group to form Compound II, 16α,17α-epoxy-3,11-diketo-Δ⁴-etiocholenic acid, is effected using chromic oxide in acetic acid according to standard procedures, well known in the art. Other oxidizing agents, for example, the chromic acid-pyridine complex can be similarly employed. The acid is next converted to an acid chloride by the intermediate formation of a sodium salt with a suitable base such as sodium hydroxide followed by reaction with oxalyl chloride. The compound so formed, Compound III, is converted to a chloro ketone, 21-methyl-21-chloro-16α,17α-epoxy-Δ⁴-pregnene-3,11,20-trione, Compound IV by reaction with diazoethane followed by treatment with hydrogen chloride in ether. Treatment of Compound IV with potassium acetate in acetone affords a mixture of both possible diasterio-isomers of 21-methyl-21-acetoxy-16α,17α-epoxy-Δ⁴-pregnene-3,11,20-trione and these are separated by chromatography, for example, on a synthetic silicate of the class described in U.S. Patent No. 2,393,625 such as Florisil available from the Floridin Company of Tallahassee, Florida, and each isomer is thereafter separately treated. The epoxide group at the 16,17-position is opened to form a bromohydrin using hydrogen bromide in acetic acid in accordance with the procedure of Julian et al. as described in the Journal of the American Chemical Society, vol. 72, page 5145 (1954). This compound is in turn debrominated using Raney nickel to form 21-methyl-Δ⁴-pregnene-17α,21-diol-3,11,20-trione 21-acetate, one of the compounds of this invention. This procedure is also described in the Julian et al. article. The 11-keto group is next reduced with sodium borohydride to produce an 11β-hydroxyl compound. Before proceeding with the reaction, however, the 21-acetoxy group should be hydrolyzed to an alcohol and the ketone groups at the 3- and the 20-positions should be protected by forming ethylene ketals by reaction with ethylene glycol. The diketal is reduced, the ketal groups removed by acid hydrolysis and the 21-hydroxy group reacetylated using the usual procedures. Dehydrogenation of this compound with selenium dioxide produces 21-methyl-Δ¹,⁴-pregnadiene-11β,17α,21-triol-3,20-dione 21-acetate. Alternatively, the double bond can be directly introduced to produce 21-methyl-Δ¹,⁴-pregnadiene-17α,21-diol-3,11,20-trione, one of the compounds of this invention. This reaction is illustrated in the examples.

As an alternative to the above described procedure, an 11-desoxy compound, that is, 16α,17α-epoxy-3-keto-Δ⁴-etiocholenic acid can be carried through a similar series of reactions and the 11β-hydroxyl group introduced using *Curvularia lunata* in accordance with the procedure of Shull et al. described in the Journal of the American Chemical Society, vol. 77, page 763 (1955).

*Example XVII.*—*11α-hydroxy-16α,17α-epoxy-3-keto-Δ⁴-etiocholenic acid*

The compound 16α,17α-epoxy-Δ⁴-pregnene-11α,21-diol-3,20-dione (M.P. 214 to 216° C.) was prepared by incubation of 16α,17α-epoxy-Δ⁴-pregnene-21-ol-3,20-dione 21-acetate with *Rhizopus nigricans* according to the procedure of Peterson et al. and 20 grams of this material were taken up in 400 ml. of hot dioxane and the mixture clarified by the filtration. To the filtrate, there was added 20 grams of periodic acid in 400 ml. of water and the resulting mixture was allowed to stand for 16 hours at 25° C. At the end of this period, the mixture was stirred into 1600 ml. of ice cold water and the whole stirred for another 30 minutes. The desired product precipitated and was recovered by filtration. The product was purified by recrystallization from ethanol:

M.P. 216 to 217° C. (d.), $\lambda_{max}$ EtOH=242 m$\mu$, $\epsilon$=15,600.

*Example XVIII.*—*16α,17α-epoxy-3,11-diketo-Δ⁴-etiocholenic acid*

A solution was prepared containing 10 grams of the compound of the previous example in 500 ml. of glacial acetic acid. To this solution, there was added dropwise with stirring over a period of 40 minutes, 100 ml. of an acetic acid solution containing 1.1 equivalents of chromium trioxide. The mixture was stirred at 25° C. for an additional hour. The resulting solution was added to 1800 ml. of water at 0° C. and filtered. The filtrate was extracted three times with 250 ml. portions of chloroform and the chloroform extract washed twice with equal volumes of water, dried over anhydrous sodium sulfate, filtered and the desired product recovered by evaporation of the solvent in vacuo. For purification, the residue was first taken up in dilute sodium hydroxide. It was then filtered and the pure acid precipitated by the addition of dilute hydrochloric acid. The product was recovered by filtration.

*Example XIX.—16α,17α-epoxy-3,11-diketo-Δ⁴-etiocholenic acid*

A slurry was prepared by the addition of 20 grams of the product of the previous example to 140 ml. of water. The solution was stirred and 42.5 ml. of 1.3 N sodium hydroxide was added. The mixture was filtered and the filtrate freeze dried to give the desired product.

*Example XX.—16α,17α-epoxy-3,11-diketo-Δ⁴-etiocholenyl chloride*

The sodium salt (21.8 grams) prepared in the previous example was taken up in 600 ml. of benzene and dried by the distilling of 200 ml. of the benzene and water azeotrope at atmospheric pressure. The resulting slurry was maintained at approximately 5° C. while 40 ml. of oxalyl chloride was added in two 20 ml. portions. The second portion was not added until the foaming resulting from the first addition had subsided. The mixture after the second addition was maintained at approximately 5° C. and stirring was continued for another 30 minutes while the temperature was permitted to slowly increase. The mixture was clarified by filtration and the filtrate evaporated in vacuo. The residue was dried to remove the benzene and taken up in 1.3 N sodium hydroxide, filtered and the filtrate adjusted to pH 2.0 with 3 N hydrochloric acid. The desired product precipitated and was recovered by filtration.

*Example XXI.—21-methyl-21-chloro-16α,17α-epoxy-Δ⁴-pregnene-3,11,20-trione*

A benzene solution containing 20 grams of the acid chloride synthesized in the previous example was mixed with an excess of diazoethane in 600 ml. of ether prepared in accordance with the standard procedures and the mixture was stirred for one hour at from −15° to −10° C. At the end of this period, 400 ml. of an ethereal solution containing 15 grams of hydrogen chloride was added at −5° C. and the mixture stirred for approximately 5 minutes. The solution was extracted three times with equal volumes of ice cold water, once with an equal volume of 5% aqueous sodium bicarbonate and again with an equal volume of water. The organic solution was dried over anhydrous sodium sulfate, filtered and the desired product recovered by removal of the solvent in vacuo.

*Example XXII. — 21-methyl-16α,17α-epoxy-Δ⁴-pregnene-3,11,20-trione 21-acetate (a mixture of diasterioisomers)*

The product obtained in the previous example (7.236 grams) was taken up in 3.66 liters of acetone and to this mixture there was added 10.35 grams of potassium bicarbonate. The mixture was then heated to approximately 50° C. and 6.15 ml. of glacial acetic acid was added. It was refluxed for 10 minutes and 5.15 grams of potassium iodide was added. The mixture was then refluxed for 16 hours and concentrated to a volume of approximately 100 ml. in vacuo. To the concentrate, there was added 300 ml. of water and the resulting solution extracted three times with 300 ml. portions of chloroform. The combined chloroform extracts were washed successively with a 200 ml. portion of water, a 200 ml. portion of 5% aqueous sodium bicarbonate and an additional 200 ml. portion of water. The chloroform solution was evaporated to dryness in vacuo.

*Example XXIII.—Separation of diasterioisomers*

A total of 18.39 grams of the compound synthesized in accordance with the procedure described in the previous example was taken up in benzene and placed on a Florisil column which formed a 20 inch bed of 2 inches diameter. The column was eluted with 4 liters of benzene (fraction 1), 5 liters of 90% benzene-10% ether (fraction 2), 2.5 liters of ether (fraction 3), 1.5 liters of chloroform (fraction 4), 3.0 liters of 90% chloroform-10% ethyl acetate (fraction 5), and 2 liters of ethyl acetate (fraction 6). Each of the fractions was separately concentrated to dryness in vacuo and the residue purified by triturating with ether. The A-isomer was found predominantly in fractions 1 and 2. The B-isomer was found predominantly in fractions 5 and 6. Fractions 3 and 4 contained mixtures of the isomers and these could be separated by further chromotography.

PHYSICAL CONSTANTS

I. 21-methyl-16α,17α-epoxy-Δ⁴-pregnene-3,11,20-trione 21-acetate
    A-isomer:
        M.P.=173–174° C.
        $[\alpha]_D^{24}=+180.1$ (diox.)
        $\lambda_{max}=237.5$ mμ
        $\epsilon=15,700$
*Analysis.*—Calcd. for $C_{24}H_{30}O_6$: C, 69.54; H, 7.30. Found: C, 69.09; H, 7.22.

II. 21-methyl-16α,17α-epoxy-Δ⁴-pregnene-3,11,20-trione 21-acetate
    B-isomer
        M.P.=204–205° C.
        $[\alpha]_D^{24}=+171.5$ (diox.)
        $\lambda_{max}=237.5$ mμ
        $\epsilon=15,800$
*Analysis.*—Calcd. for $C_{24}H_{30}O_6$: C, 69.54; H, 7.30. Found: C, 69.96; H. 35.

*Example XXIV.—16β-bromo-21-methyl-Δ⁴-pregnene-17α,21-diol-3,11,20-trione 21-acetate*

To a suspension containing 3.05 grams of the 21-acetoxy compound in 23 ml. of glacial acetic acid there was added 7.6 ml. of 30% hydrogen bromide solution in glacial acetic acid. The solution was allowed to stand at 25° C. for one hour. To this solution at 0° C., there was added 300 ml. of water. The desired product precipitated and was recovered by filtration.

Each of the isomers was subjected to the foregoing treatment.

PHYSICAL CONSTANTS

I. 16β-bromo-21-methyl-Δ⁴-pregnene-17α,21-diol-3,11,20-trione 21-acetate
    A-isomer:
        M.P.=186–187° C. (d.)
        $[\alpha]_D^{24}=+167.9$ (diox.)
        $\lambda_{max}=238$ mμ
        $\epsilon=15,800$
*Analysis.*—Calcd. for $C_{24}H_{31}O_6Br$: C, 58.18; H, 6.31; Br, 16.13. Found: C, 58.30; H, 6.36; Br, 16.32.

II. 16β-bromo-21-methyl-Δ⁴-pregnene-17α,21-diol-3,11,20-trione 21-acetate
    B-isomer:
        M.P.=222–223° C. (d.)
        $[\alpha]_D^{24}=+132.1$ (diox.)
        $\lambda_{max}=238$ mμ
        $\epsilon=15,900$
*Analysis.*—Calcd. for $C_{24}H_{31}O_6Br$: C, 58.18; H, 6.31; Br, 16.13. Found: C, 58.48; H, 6.34; Br, 16.23.

*Example XXV.—21-methyl-Δ⁴-pregnene-17α,21-diol-3,11,20-trione 21-acetate*

A mixture containing 1 gram of bromohydrin and 10 grams of Raney nickel in 140 ml. of methanol was stirred in a nitrogen atmosphere at 25° C. for 4 hours. The mixture was filtered and concentrated to dryness. The residue was taken up in 50 ml. of chloroform and the chloroform solution washed twice with 30 ml. portions of water. The organic layer was separated, dried over anhydrous sodium sulfate, filtered and concentrated to dryness. The residue triturated with a mixture of ethyl acetate and ether, filtered and dried.

Each of the isomers was subjected to the foregoing treatment.

PHYSICAL CONSTANTS

I. 21-methyl-$\Delta^4$-pregnene-17$\alpha$,21-diol - 3,11,20-trione 21-acetate.
   A-isomer:
      M.P.=179–180° C.
      $[\alpha]_D^{22}=+169.1$ (diox.)
      $\lambda_{max}=238$ m$\mu$
      $\epsilon=15,400$
   *Analysis.*—Calcd. for $C_{24}H_{32}O_6$: C, 69.21; H, 7.75. Found: C, 68.86; H, 7.75.

II. 21-methyl-$\Delta^4$-pregnene-17$\alpha$,21-diol-3,11,20 - trione 21-acetate.
   B-isomer:
      M.P.=173–175° C.
      $[\alpha]_D^{22}=+170.1$ (diox.)
      $\lambda_{max}=238$ m$\mu$
      $\epsilon=14,600$
   *Analysis.*—Calcd. for $C_{24}H_{32}O_6$: C, 69.21; H, 7.75. Found: C, 69.17; H, 7.85.

*Example XXVI.—21-methyl-$\Delta^{1,4}$-pregnadiene-17$\alpha$,21-diol-3,11,20-trione 21-acetate*

A total of 1.0 gram of the compound prepared in accordance with the procedure described in the previous example was taken up in 50 ml. of tertiary amyl alcohol containing 0.5 ml. of glacial acetic acid and 1.1 grams of selenium dioxide was added. The solution was refluxed for 20 hours. It was then filtered and the filtrate washed successively with equal volumes of water, 10% aqueous sodium bisulfite solution (3 times) and finally with two portions of water. The organic solution was evaporated to dryness in vacuo and the residue triturated with ethyl acetate and ether. The product was purified by recrystallization from methanol containing a small portion of activated charcoal.

Each of the isomers was subjected to the foregoing treatment.

PHYSICAL CONSTANTS

I. 21-methyl-$\Delta^{1,4}$-pregnadiene-17$\alpha$,21-diol-3,11,20 - trione 21-acetate
   A-isomer:
      M.P.=182–183° C.
      $[\alpha]_D^{22}=+145.4$ (diox.)
      $\lambda_{max}=239$ m$\mu$
      $\epsilon=15,300$
   *Analysis.*—Calcd. for $C_{24}H_{30}O_6$: C, 69.54; H, 7.30; Found: C, 68.77; H, 7.09.

II. 21-methyl-$\Delta^{1,4}$-pregnadiene-17$\alpha$,21-diol-3,11,20 - trione 21-acetate
   B-isomer:
      M.P.=207–208° C.
      $[\alpha]_D^{22}=+166.7$ (diox.)
      $\lambda_{max}=239$ m$\mu$
      $\epsilon=15,300$
   *Analysis.*—Calcd. for $C_{24}H_{30}O_6$: C, 69.54; H, 7.30; Found: C, 69.19; H, 7.31.

The following table presents the physical constants of some of the compounds within the purview of this invention.

TABLE I

I. 21-methyl-$\Delta^4$-pregnene-17$\alpha$,21-diol-3,11,20 - trione 21-acetate
   A-isomer:
      M.P.=179–180° C.
      $[\alpha]_D=+169°$
      $\lambda_{max}^{alc}=238$ m$\mu$ (15,400)

II. 21-methyl-$\Delta^{1,4}$-pregnadiene-17$\alpha$,21-diol-3,11,20 - trione 21-acetate
   A-isomer:
      M.P.=182–183° C.
      $[\alpha]_D=+145°$
      $\lambda_{max}^{alc}=239$ m$\mu$ (15,300)

III. 21-methyl-$\Delta^4$-pregnene-17$\alpha$,21-diol-3,11,20-trione 21-acetate
   B-isomer:
      M.P.=177–178° C.
      $[\alpha]_D=+170°$
      $\lambda_{max}^{alc}=238$ m$\mu$ (15,000)

IV. 21-methyl-$\Delta^{1,4}$-pregnadiene-17$\alpha$,21-diol-3,11,20-trione 21-acetate
   B-isomer:
      M.P.=207–208° C.
      $[\alpha]_D=167°$
      $\lambda_{max}^{alc}=238$ m$\mu$ (14,500)

V. 21-methyl-$\Delta^4$-pregnene-11$\beta$,17$\alpha$,21-triol - 3,20 - dione 21-acetate
   A-isomer:
      M.P.=202–205° C.
      $[\alpha]_D=+125°$
      $\lambda_{max}^{alc}=242$ m$\mu$ (14,500)

VI. 21-methyl-$\Delta^4$-pregnene-11$\beta$,17$\alpha$,21-triol - 3,20 - dione 21-acetate
   A-isomer:
      M.P.=209–211° C.
      $[\alpha]_D=+155°$
      $\lambda_{max}^{alc}=242$ m$\mu$ (15,700)

VII. 9$\alpha$-fluoro-21-methyl-$\Delta^4$-pregnene-11$\beta$,17$\alpha$,21 - triol-3,20-dione 21-acetate
   A-isomer:
      M.P.=152–154° C.
      $[\alpha]_D=+115°$
      $\lambda_{max}^{alc}=244$ m$\mu$ (15,700)
      $\lambda_{max}=2.90, 5.84, 5.87$ and 6.08

VIII. 9$\alpha$-fluoro-21-methyl-$\Delta^4$-pregnene-11$\beta$,17$\alpha$,21 - triol-3,20-dione 21-acetate
   A-isomer:
      M.P.=241–243° C.
      $[\alpha]_D=+117.1$
      $\lambda_{max}^{alc}=239$ m$\mu$ (16,800)
      $\lambda_{max}=2.95, 5.79, 5.84$ and 6.07

IX. 9$\alpha$-fluoro-21-methyl-$\Delta^{1,4}$-pregnadiene-11$\beta$,17$\alpha$,21-triol-3,20 dione 21-acetate
   A-isomer:
      M.P.=247–248°
      $[\alpha]_D=+60.2$
      $\lambda_{max}^{alc}=239$ m$\mu$ (14,400)

X. 9$\alpha$-fluoro-21-methyl-$\Delta^{1,4}$-pregnadiene-11$\beta$,17$\alpha$,21-triol-3,20-dione 21-acetate
   B-isomer:
      M.P.=234–238° C. (d.)
      $[\alpha]_D=+127°$
      $\lambda_{max}^{alc}=240$ m$\mu$ (14,500)

XI. 9$\alpha$-fluoro-21-methyl-$\Delta^{1,4}$ - pregnadiene - 11$\beta$,17$\alpha$,21-triol-3,20-dione
   B-isomer:

M.P.=223–224° C.
[α]_D=+139°

$\lambda_{max}^{alc}=239$ mμ (14,800)

*Example XXVII.—9α-fluoro-21-methyl-Δ¹,⁴-pregnadiene-11β,17α,21-triol-3,20-dione 21-diethyl-aminoacetate and related compounds*

9α-fluoro-21-methyl-Δ¹,⁴-pregnadiene-11β,17α,21 - triol-3,20-dione, B-isomer, 30.22 g., is dissolved in 120 ml. of dimethylformamide and 10.5 ml. of pyridine. The mixture is cooled to 7° C. and 10 ml. of chloroacetyl chloride is added dropwise during 30 minutes. The mixture is allowed to come to room temperature, 23° C., then is poured slowly into 500 ml. of 1 N sulfuric acid; during the addition, the suspension is stirred and is maintained at 10° C. The crystals, which precipitate, are removed by filtration and are washed with water until the washings are neutral. After drying in a vacuum, the product, 9α - fluoro - 21methyl - Δ¹,⁴-pregnadiene-11β,17α,21-triol-3,20-dione 21-chloroacetate, weighs 38.4 g. Recrystallization from acetone and water mixtures affords an analytically pure sample, M.P. 227–228° C., λ_max MeOH, 238 mμ (ε=15,600).

The procedure is repeated substituting for the 9α-fluoro-steroid, a stoichiometrically equivalent amount of 6α,9α-difluoro-21-methyl - Δ¹,⁴ - pregnadiene-11β,17α,21-triol-3,20-dione, B-isomer. There is obtained 6α,9α-difluoro-21-methyl-Δ¹,⁴-pregnadiene-11β,17α,21 - triol-3,20-dione 21-chloroacetate.

The 9α - fluoro-21-methyl-Δ¹,⁴-pregnadiene-11β,17α,21-triol-3,20-dione 21-chloroacetate, 4.3 g., is suspended in 50 ml. of diethylamine and the suspension is refluxed under nitrogen for 1.5 hours. The excess diethylamine is evaporated in vacuo and the residue is dissolved in 50 ml. of chloroform. The chloroform solution is washed with 15 ml. of 4% aqueous sodium bicarbonate, and twice with 15 ml. of water. The chloroform layer is separated, is dried over anhydrous sodium sulfate and the solvent is evaporated. The crystalline residue, 5.4 g., is recrystallized from 75 ml. of acetone. The crystals of 9α-fluoro-21-methyl-Δ¹,⁴-pregnadiene - 11β,17α,21 - triol-3,20-dione 21-diethylaminoacetate after two recrystallizations from chloroform-hexane (1:2) melt at 191.5–192.5° C.

The hydrochloric acid addition salt of 9α-fluoro-21-methyl-Δ¹,⁴-pregnadiene-11β,17α,21-triol - 3,20 - dione 21-diethylaminoacetate is prepared: a saturated solution of hydrogen chloride in ether, 150 ml., is added to a solution of 45.8 g. of the said diethylamino acetate in 2.5 liters of acetone at 40° C. The suspension is concentrated at 45° C. to about 0.5 liter, is cooled to 5° C. and is filtered. The crystals are washed with acetone and 42.6 g. of tan solids are obtained; after drying, M.P., 221–222.5°. A more pure product is obtained after further crystallization from ethanol and hexane and finally, from acetone, M.P., 223–224° C., with decomposition; λ_max MeOH, 239 mμ (ε=14,630); α_D, +123.5 (C, 2.04; MeOH).

By the same procedure, starting with 6α,9α-difluoro-21-methyl-Δ¹,⁴-pregnadiene-11β,17α,21-triol - 3,20 - dione 21-chloroacetate there are prepared 6α,9α-difluoro-21-methyl-Δ¹,⁴-pregnadiene-11β,17α,21-triol 21-diethylaminoacetate and the hydrochloric acid addition salt thereof.

The A-isomers of these compounds are prepared in the same manner described in detail for the B-isomers, above.

*Example XXVIII.—Preparation of 21-aminoacyl esters of 9α-fluoro-21-methyl-Δ¹,⁴-pregnadiene-11β,17α,21 - triol-3,20-dione and related compounds*

The procedure of Example XXVII is repeated substituting for diethylamine, stoichiometrically equivalent amounts of dimethylamine, piperidine, morpholine and di-n-butylamine. In the case of dimethylamine, a pressure vessel is used.

The following products are obtained:

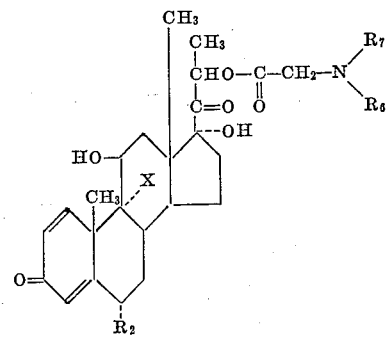

| X | R₂ | R₆ | R₇ |
|---|----|----|----|
| F | H | n-C₄H₉ | n-C₄H₉ |
| F | H | CH₃ | CH₃ |
| F | H | —CH₂CH₂OCH₂CH₂— | |
| F | H | —CH₂CH₂CH₂CH₂CH₂— | |
| F | F | n-C₄H₉ | n-C₄H₉ |
| F | F | CH₃ | CH₃ |
| F | F | —CH₂CH₂OCH₂CH₂— | |
| F | F | —CH₂CH₂CH₂CH₂CH₂— | |

The hydrochloric acid addition salts of these compounds are obtained by the procedure outlined in the previous example. In a similar manner, substituting solutions of the appropriate acids for hydrogen chloride in ether, there are obtained the sulfuric acid addition salts, the hydrobromic acid addition salts and the phosphoric acid addition salts of the B- and A-isomers of the 21-aminoacyl esters of the compounds prepared in Example XXVII and in this example.

What is claimed is:
1. A compound selected from the group consisting of those having the formulas:

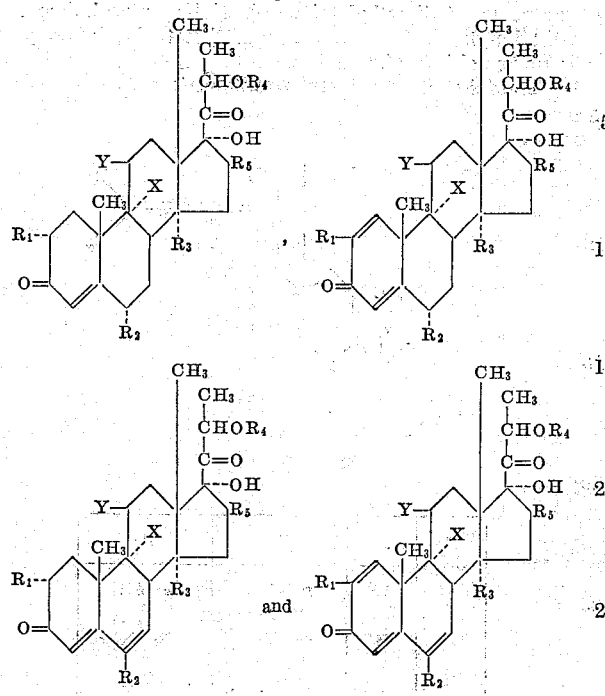

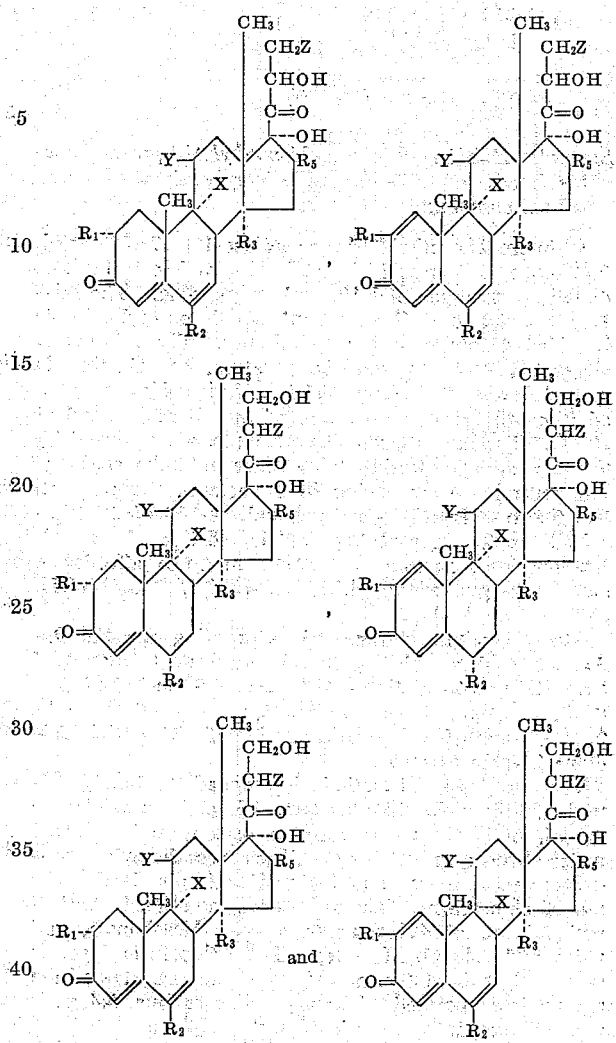

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_4$ is selected from the group consisting of hydrogen and acyl, said acyl group being derived from mono- and dicarboxylic acids containing up to ten carbon atoms; $R_5$ is selected from the group consisting of

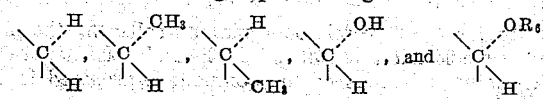

wherein $R_6$ is an acyl group containing only carbon, hydrogen and oxygen atoms being derived from mono- and dicarboxylic acids containing up to ten carbon atoms; X is selected from the group consisting of hydrogen, halogen, methoxy and ethoxy and Y is selected from the group consisting of keto and $\beta$-hydroxyl; at least three of $R_1$, $R_2$, $R_3$ and the additional substituent on a hydrogen substituted number sixteen carbon atom always being hydrogen; alkali and alkaline earth metal salts of said acylated compounds wherein the acyl group is derived from a dicarboxylic acid; acid addition salts of said acylated compounds wherein the acyl group is derived from an amino carboxylic acid and 16,17-acetonides of said 16,17-hydroxylated compounds wherein the acetonide moiety contains from two to nine carbon atoms.

2. A pharmaceutical composition comprising a compound as claimed in claim 1 together with a pharmaceutically acceptable carrier.

3. A process for the preparation of 21-hydroxy and 21-hydroxymethyl compounds which comprises reacting a compound having the formula:

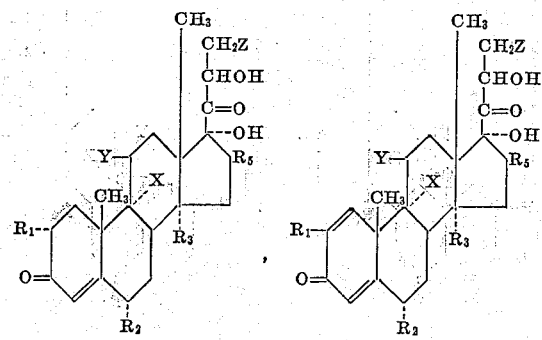

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of

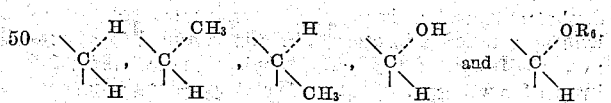

wherein $R_6$ is an acyl group; X is selected from the group consisting of hydrogen, halogen, methoxy and ethoxy, Z is selected from the group consisting of iodine and bromine atoms and Y is selected from the group consisting of keto and $\beta$-hydroxyl; at least three of $R_1$, $R_2$, $R_3$ and the additional substituent on a hydrogen substituted number sixteen carbon atom always being hydrogen; an acyl group containing only carbon, hydrogen and oxygen atoms being derived from mono- and dicarboxylic acids containing up to ten carbon atoms, with hydrogen in the presence of a Raney nickel catalyst in a reaction inert organic solvent at a temperature below 30° C.

4. A compound selected from the group consisting of the A-isomer of 9$\alpha$-fluoro-21-methyl-$\Delta^{1,4}$-pregnadiene-11$\beta$,17$\alpha$,21-triol-3,20-dione and the 21 acyl esters thereof wherein the acyl group is derived from mono- and dicarboxylic acids containing up to ten carbon atoms.

5. A compound selected from the group consisting of the B-isomer of 9$\alpha$-fluoro-21-methyl-$\Delta^{1,4}$-pregnadiene-17$\beta$,17$\alpha$,21-triol-3,20-dione and the 21-acyl esters thereof wherein the acyl group is derived from mono- and dicarboxylic acids containing up to ten carbon atoms.

6. A compound selected from the group consisting of the A-isomer of 6α,9α-difluoro-21-methyl-$\Delta^{1,4}$-pregnadiene-11β,17α,21-triol-3,20-dione and the 21-acyl esters thereof wherein the acyl group is derived from mono- and dicarboxylic acids containing up to ten carbon atoms.

7. A compound selected from the group consisting of the B-isomer of 6α,9α-difluoro-21-methyl-$\Delta^{1,4}$-pregnadiene-11β,17α,21-triol-3,20-dione and the 21-acyl esters thereof wherein the acyl group is derived from mono- and dicarboxylic acids containing up to ten carbon atoms.

No references cited.

LEWIS GOTTS, *Primary Examiner.*